US007974869B1

(12) United States Patent  
Sharma et al.

(10) Patent No.: US 7,974,869 B1
(45) Date of Patent: Jul. 5, 2011

(54) METHOD AND SYSTEM FOR AUTOMATICALLY MEASURING AND FORECASTING THE BEHAVIORAL CHARACTERIZATION OF CUSTOMERS TO HELP CUSTOMIZE PROGRAMMING CONTENTS IN A MEDIA NETWORK

(75) Inventors: Rajeev Sharma, State College, PA (US); Satish Mummareddy, Washington, DC (US); Jeff Hershey, Norfolk, VA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 959 days.

(21) Appl. No.: 11/901,691

(22) Filed: Sep. 18, 2007

Related U.S. Application Data

(60) Provisional application No. 60/846,014, filed on Sep. 20, 2006.

(51) Int. Cl.
*G06F 17/00* (2006.01)
(52) U.S. Cl. ..................................................... 705/7.31
(58) Field of Classification Search .................... 705/10, 705/7.31
See application file for complete search history.

(56) References Cited

U.S. PATENT DOCUMENTS

| | | | |
|---|---|---|---|
| 5,047,614 A | 9/1991 | Bianco | |
| 5,155,591 A | 10/1992 | Wachob | |
| 5,283,731 A | 2/1994 | Lalonde et al. | |
| 5,309,355 A | 5/1994 | Lockwood | |
| 5,459,306 A | 10/1995 | Stein et al. | |
| 5,636,346 A | 6/1997 | Saxe | |
| 6,002,393 A | 12/1999 | Hite et al. | |
| 6,055,573 A | 4/2000 | Gardenswartz et al. | |
| 6,119,098 A | 9/2000 | Guyot et al. | |
| 6,182,050 B1 | 1/2001 | Ballard | |
| 6,298,330 B1 | 10/2001 | Gardenswartz et al. | |
| 6,385,592 B1 | 5/2002 | Angles et al. | |
| 6,408,278 B1 | 6/2002 | Carney et al. | |
| 6,484,148 B1 | 11/2002 | Boyd | |
| 6,529,940 B1 | 3/2003 | Humble | |
| 6,584,401 B2 | 6/2003 | Kirshenbaum et al. | |
| 6,847,969 B1 | 1/2005 | Mathai et al. | |
| 7,671,728 B2 * | 3/2010 | Buehler | 340/506 |
| 7,778,863 B2 * | 8/2010 | Yoshida et al. | 705/10 |
| 2002/0178085 A1 | 11/2002 | Sorensen | |

(Continued)

OTHER PUBLICATIONS

W. E. L. Grimson, et al., "Using adaptive tracking to classify and monitor activities in a site," in IEEE Conference on Computer Vision and Pattern Recognition, 1998.

(Continued)

*Primary Examiner* — Thomas Dixon

(57) ABSTRACT

The present invention is a method and system for forecasting the behavioral characterization of customers to help customize programming contents on each means for playing output of each site of a plurality of sites in a media network through automatically measuring, characterizing, and forecasting the behavioral information of customers that appear in the vicinity of each means for playing output. The analysis of behavioral information of customers is performed automatically based on the visual information of the customers, using a plurality of means for capturing images and a plurality of computer vision technologies on the visual information. The measurement of the behavioral information is performed in each measured node, where the node is defined as means for playing output. Extrapolation of the measurement characterizes the behavioral information per each node of a plurality of nodes in a site of a plurality of sites of a media network. The forecasting and customization of the programming contents is based on the characterization of the behavioral information.

40 Claims, 36 Drawing Sheets

U.S. PATENT DOCUMENTS

| | | | |
|---|---|---|---|
| 2003/0002712 | A1 | 1/2003 | Steenburgh et al. |
| 2003/0053659 | A1 | 3/2003 | Pavlidis et al. |
| 2003/0058339 | A1 | 3/2003 | Trajkovic et al. |
| 2004/0120581 | A1 | 6/2004 | Ozer et al. |
| 2004/0131254 | A1 | 7/2004 | Liang et al. |
| 2006/0010028 | A1 | 1/2006 | Sorensen |
| 2006/0010030 | A1* | 1/2006 | Sorensen ................. 705/10 |
| 2006/0036485 | A1 | 2/2006 | Duri et al. |
| 2006/0259346 | A1* | 11/2006 | Williamson ............. 705/10 |
| 2007/0055563 | A1* | 3/2007 | Godsey et al. ........... 705/10 |
| 2010/0002082 | A1* | 1/2010 | Buehler et al. ............ 348/159 |

OTHER PUBLICATIONS

C. Stauffer, et al., "Adaptive background mixture models for real-time tracking," in IEEE Conference on Computer Vision and Pattern Recognition, 1999.

N. Friedman and S. Russell, "Image segmentation in video sequences: A probabilistic approach," in Thirteenth Conference on Uncertainty in Artificial Intelligence, 1997.

G. R. Bradski, "Computer vision face tracking for use in a perceptual user interface," Intel Technology Journal, Q2, 1998.

F. Porikli, "Multi-camera surveillance: Object-based summarization approach," MERL, 2004.

H. Buxton and S. Gong, "Visual surveillance in a dynamic and uncertain world," Artificial Intelligence, 1995, pp. 431-459.

H. Buxton and S. Gong, "Advanced visual surveillance using Bayesian Networks," in International Conference on Computer Vision, 1995, Cambridge, Massachusetts.

H. Buxton, "Learning and understanding dynamic scene activity: a review," Image and Vision Computing 21, 2003, pp. 125-136.

A. Cohn, et al., "Towards an architecture for cognitive vision using qualitative spatio-temporal representations and abduction," Spatial Cognition III, 2003.

J. Fernyhough, A.G. Cohn, and D. Hogg, "Event recognition using qualitative reasoning on automatically generated spatio-temporal models from visual input," in IJCAI'97 Workshop on Spatial and Temporal Reasoning, 1977. Nagoya.

J. Fernyhough, et al., "Constructing qualitative event models automatically from video input," Image and Vision Computing 18, 2000, pp. 81-103.

A. Galata, et al., "Modeling interaction using learnt qualitative spatio-temporal relations and variable length Markov Models," in European Conference on Artificial Intelligence, 2002, Lyon.

S.G. Gong and H. Buxton, "Bayesian nets for mapping contextual knowledge to computational constraints in motion segmentation and tracking," in British Machine Vision Conference, 1993, Guildford, England.

R. Howarth and H. Buxton, "Selective attention in dynamic vision," in Thirteenth International Joint Conference on Artificial Intelligence," 1993, Chambery, France.

Y. Ivanov, et al., "Video surveillance of interactions," in CVPR'99 Workshop on Visual Surveillance, 1998, Fort Collins, Colorado.

Y. Ivanov and A. Bobick, "Recognition of visual activities and interactions by stochastic parsing," IEEE Trans on Pattern Analysis and Machine Intelligence, 2000 22(8), pp. 852-872.

G. Medioni, et al., "Event detection and analysis from video streams," IEEE Trans on Pattern Analysis and Machine Intelligence, 2001 23(8), pp. 873-889.

D. Moore and I. Essa, "Recognizing multitasked activities using Stochastic context-free grammar," in Workshop on Models versus Exemplars in Computer Vision held in conjunction with IEEE CVPR 2001, 2001, Kauai, Hawaii.

N. Rota and M. Thonnat, "Activity recognition from video sequences using declarative models," in 14th European Conference on Artificial Intelligence, 2000, Berlin, Germany.

M. Brand and V. Kettnaker, "Discovery and segmentation of activities in video," IEEE Trans on Pattern Analysis and Machine Intelligence, 2000 22(8), p. 844-851.

* cited by examiner

| NODE 1 | TIME | | | | | | 610 |
|---|---|---|---|---|---|---|---|
| | T1 | T2 | T3 | | Tn-1 | Tn | |
| BHEAVIOR CATEGORY — CAT.1 | 45% | 47% | 50% | ... | 52% | 56% | |
| BHEAVIOR CATEGORY — CAT.2 | 35% | 28% | 34% | ... | 40% | 42% | |
| BHEAVIOR CATEGORY — CAT.3 | 20% | 25% | 16% | ... | 8% | 2% | |

⋮

| NODE N | TIME | | | | | | 611 |
|---|---|---|---|---|---|---|---|
| | T1 | T2 | T3 | | Tn-1 | Tn | |
| BEHAVIOR CATEGORY — CAT.1 | 30% | 32% | 35% | ... | 33% | 30% | |
| BEHAVIOR CATEGORY — CAT.2 | 20% | 28% | 34% | ... | 26% | 22% | |
| BEHAVIOR CATEGORY — CAT.3 | 50% | 40% | 31% | ... | 41% | 48% | |

UNIT: %

Fig. 15

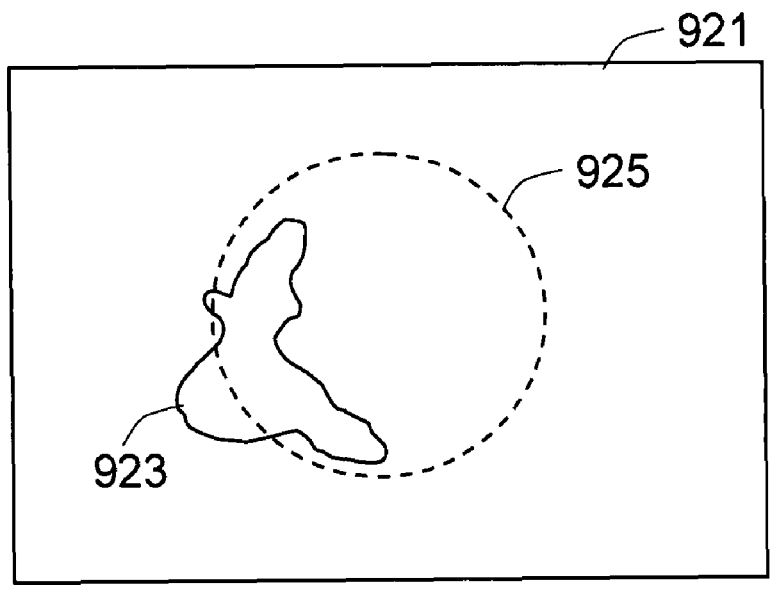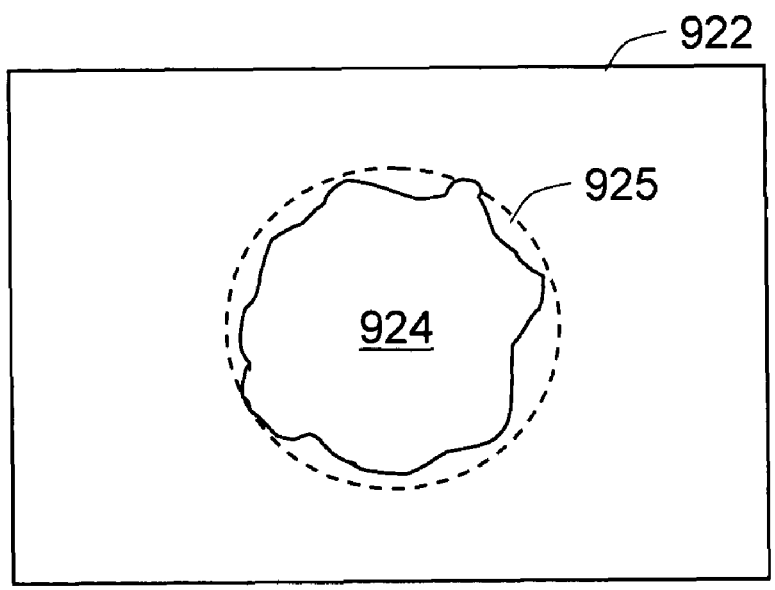
Fig. 17

| INTERACTION DESCRIPTION | SHOPPING INTERACTION LEVELS |
|---|---|
| PASSING BY NO CHANGE IN VELOCITY | LEVEL 1 |
| NOTICING SLOWING DOWN + REGAIN VELOCITY | LEVEL 2 |
| STOPPING | LEVEL 3 |
| ENGAGING 1 STOPPING FOR N>T1 SECONDS ... ENGAGING P-1 STOPPING FOR N>TP-1 SECONDS | LEVEL 4 ... LEVEL P-1 |
| PURCHASE | LEVEL P |

Fig. 21

| TO FROM | CAT. 1 | CAT. 2 | CAT. 3 | CAT. 4 | CAT. 5 | ... | CAT. 14 | CAT. 15 |
|---|---|---|---|---|---|---|---|---|
| CAT. 1 |  | 394 | 514 | 130 | - | ... | - | - |
| CAT. 2 | 21 |  | 338 | 321 | - | ... | - | - |
| CAT. 3 | 57 | 123 |  | 212 | 328 | ... | - | - |
| CAT. 4 | 21 | 384 | 63 |  | 483 | ... | - | - |
| CAT. 5 | - | - | 38 | 356 |  | ... | - | - |
| ... | ... | ... | ... | ... | ... | ... | ... | ... |
| CAT. 14 | - | - | - | - | - | ... |  | 230 |
| CAT. 15 | - | - | - | - | - | ... | 824 |  |

| NODE 1 | BEHAVIOR MEASUREMENT DURING WINDOW OF TIME W1 (T1~Tn) | | | | | |
|---|---|---|---|---|---|---|
| CUST. 1 | (C1,PB, BD) | (C2,PB, BD) | (C3,L2, BD) | ... | (C4,PB, BD) | |
| CUST. 2 | (C1,PB, BD) | (C3,L2, D) | (C2,PB, AD) | ... | (C4,PB, BD) | (C5,L3, D) |
| ⋮ | | | ... | | | |
| CUST. I-1 | | (C1,PB, BD) | (C4,L2, BD) | ... | (C3,PB, D) | (C3,PB, AD) |
| CUST. I | (C4,PB, BD) | (C3,L3, D) | (C2,L2, AD) | (C1,PB, AD) | | |

⋮

| NODE N | BEHAVIOR MEASUREMENT DURING WINDOW OF TIME W1 (T1~Tn) | | | | | |
|---|---|---|---|---|---|---|
| CUST. J | (C10,PB, BD) | (C11,PB, BD) | (C13,PB, BD) | ... | (C11,L2, BD) | (C12,PB, D) |
| ⋮ | | | ... | | | |
| CUST. L-1 | | (C12,L3, D) | (C13,L2, AD) | ... | (C14,PB, AD) | |
| CUST. L | | (C10,L2, BD) | (C14,PB, BD) | ... | (C12,PB, D) | (C13,PB, AD) |
| ⋮ | | | ... | | | |
| CUST. M | (C11,PB, BD) | (C12,L3, D) | (C12,L2, AD) | (C11,PB, AD) | | |

| NODE 1 | BEHAVIOR MEASUREMENT DURING WINDOW OF TIME W1 (T1~Tn) | | | | | |
|---|---|---|---|---|---|---|
| CUST. 1 | (C1,PB, BD) | (C2,PB, BD) | (C3,L2, BD) | ... | (C4,PB, BD) | |
| CUST. 2 | (C1,PB, BD) | (C3,L2, D) | (C2,PB, AD) | ... | (C4,PB, BD) | (C5,L3, D) |
| ⋮ | | | ... | | | |
| CUST. I-1 | | (C1,PB, BD) | (C4,L2, BD) | ... | (C3,PB, D) | (C3,PB, AD) |
| CUST. I | (C4,PB, BD) | (C3,L3, D) | (C2,L2, AD) | (C1,PB, AD) | | |

⋮

838

| NODE 1 | BEHAVIOR MEASUREMENT DURING WINDOW OF TIME Wp (T1~Tn) | | | | | |
|---|---|---|---|---|---|---|
| CUST. 1 | (C2,PB, BD) | (C3,PB, D) | (C1,L2, AD) | ... | (C1,PB, AD) | |
| ⋮ | | | ... | | | |
| CUST. J-1 | | (C1,PB, BD) | (C3,L2, D) | ... | (C4,L2, AD) | (C5,PB, AD) |
| CUST. J | (C2,PB, BD) | (C1,PB, BD) | (C3,L2, D) | ... | (C4,PB, AD) | |
| ⋮ | | | ... | | | |
| CUST. K | | (C3,L3, D) | (C2,PB, AD) | ... | (C1,PB, BD) | (C3,PB, D) |

Fig. 24

| CATEGORY OF CLUSTERED SITES | NODE TYPE |
|---|---|
| CLUSTER CATEGORY 1 | NT1  NT2  NT3  NT4 |
| CLUSTER CATEGORY 2 | NT5  NT6  NT7 |
| CLUSTER CATEGORY 3 | NT8  NT9  NT10 |
| ⋮ | ⋮ |

162

| NODE TYPE | NODE CLUSTER CATEGORY, SITE, AND LOCATION | | |
|---|---|---|---|
| NT1 | [CAT1, SITE1, LOC1] | [CAT1, SITE2, LOC1] | |
| NT2 | [CAT1, SITE1, LOC2] | [CAT1, SITE2, LOC2] | [CAT1, SITE3, LOC2] |
| NT3 | [CAT1, SITE1, LOC3] | [CAT1, SITE3, LOC3] | |
| NT4 | [CAT1, SITE1, LOC4] | [CAT1, SITE2, LOC4] | [CAT1, SITE3, LOC4] |
| NT5 | [CAT2, SITE4, LOC5] | [CAT2, SITE5, LOC5] | |
| NT6 | [CAT2, SITE4, LOC6] | [CAT2, SITE5, LOC6] | |
| NT7 | [CAT2, SITE4, LOC7] | [CAT2, SITE5, LOC7] | |
| NT8 | [CAT3, SITE6, LOC8] | [CAT3, SITE7, LOC8] | |
| NT9 | [CAT3, SITE6, LOC9] | [CAT3, SITE7, LOC9] | |
| NT10 | [CAT3, SITE6, LOC10] | [CAT3, SITE7, LOC10] | |
| ⋮ | ⋮ | | |

| TRENDS | REQUIRED DATA | EXPERT INPUT (IN ABSENCE OF DATA) |
|---|---|---|
| YEARLY GROWTH | >16 MONTHS | GROWTH PREDICTION |
| MONTH OF THE YEAR PATTERNS | >16 MONTHS | RELATIVE TRAFFIC BETWEEN MONTHS |
| WEEK OF THE MONTH PATTERNS | >3 MONTHS | RELATIVE TRAFFIC BETWEEN WEEKS |
| DAY OF THE WEEK PATTERNS | >1 MONTH | RELATIVE TRAFFIC BY DAY OF WEEK |
| HOUR OF THE DAY PATTERNS | >1 WEEK | RELATIVE TRAFFIC BY TIME OF DAY |
| SPECIAL SHOPPING DAYS / WEEKS | >14 MONTHS | RELATIVE TRAFFIC FOR SPECIAL DAYS/WEEKS |
| HOLIDAYS | >12 MONTHS + USER VERIFICATION | HOLIDAY DATES |

164

| BUSINESS UNFORESEEN FACTORS | REQUIRED DATA | EXPERT INPUT (IN ABSENCE OF DATA) |
|---|---|---|
| PROMOTIONS/ CAMPAIGNS | TRENDS + FEW P/C | RELATIVE CHANGE DUE TO P/C |
| NEW PRODUCT INTRODUCTIONS | TRENDS + FEW NPI | RELATIVE CHANGE DUE TO NPI |
| WEATHER | TRENDS + FEW INCIDENTS | RELATIVE CHANGE DUE TO WEATHER |

METHOD AND SYSTEM FOR AUTOMATICALLY MEASURING AND FORECASTING THE BEHAVIORAL CHARACTERIZATION OF CUSTOMERS TO HELP CUSTOMIZE PROGRAMMING CONTENTS IN A MEDIA NETWORK

CROSS-REFERENCE TO RELATED APPLICATIONS

This application claims the benefit of U.S. Provisional Patent Application No. 60/846,014, filed Sep. 20, 2006.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for forecasting the behavioral characterization of customers to help customize programming contents on each node, defined as means for playing output, of each site of a plurality of sites in a media network through automatically measuring, characterizing, and forecasting the behavioral information of customers that appear in the vicinity of each means for playing output, using a plurality of image capturing devices and a plurality of computer vision technologies on the visual information, and the present invention is called behavior-based programming (BBP).

2. Background of the Invention

There have been earlier attempts to help customers and salespersons in a shopping process utilizing computer-aided devices, such as U.S. Pat. No. 5,047,614 of Bianco, U.S. Pat. No. 5,283,731 of Lalonde, et al. (hereinafter Lalonde), and U.S. Pat. No. 5,309,355 of Lockwood. Bianco disclosed a portable and remote bar code reading means. Lalonde disclosed a computer-based classified advertisement system. Lockwood disclosed an automated sales system, which enhances a travel agent's marketing ability; especially with regard to computerized airline reservation systems.

There have also been attempts to customize and distribute targeted advertising content to customers or television viewers based on customer profiles, customer purchase history, or demographic information from the customer in the prior art.

U.S. Pat. No. 5,155,591 of Wachob and U.S. Pat. No. 5,636,346 of Saxe disclosed methods and systems for delivering targeted advertisements and programming to demographically targeted television audiences. U.S. Pat. No. 6,002,393 of Hite, et al. disclosed a system and method for delivering targeted TV advertisements to customers utilizing controllers.

U.S. Pat. No. 5,459,306 of Stein, et al. (hereinafter Stein) disclosed a method and system for delivering product picks to a prospective individual user, especially with regard to a movie rental and sale business. Stein gathered the user information and the user's usage information, which are correlated with a user code and classified based on the use of at least one product. The product picks (promotions and recommendations) were delivered based on the classified information and the user information. However, Stein is foreign to the automatic method of gathering the user information, especially the user behavior, in a store.

U.S. Pat. No. 6,119,098 of Guyot, et al. (hereinafter Guyot) disclosed a method and apparatus for targeting and distributing advertisements over a distributed network, such as the Internet, to the subscriber's computer. The targeted advertisements were based on a personal profile provided by the subscriber. Guyot was primarily intended for the subscriber with a computer at home, not at a physical space, such as a retail place, and the targeted advertisement creation relied on the non-automatic response from the customer.

U.S. Pat. No. 6,182,050 of Ballard disclosed a method and apparatus for distributing advertisements online using target criteria screening, which also provided a method for maintaining end user privacy. In the disclosure, the demographic information or a desired affinity ranking was gathered by the end user, who completed a demographic questionnaire and ranked various categories of products and services. Ballard is foreign to the behavior analysis of customers in a retail store.

U.S. Pat. No. 6,055,573 of Gardenswartz, et al. and its continuation U.S. Pat. No. 6,298,330 of Gardenswartz, et al. (hereinafter Gardenswartz) disclosed a method and apparatus for communicating with a computer in a network based on the offline purchase history of a particular customer. Gardenswartz included the delivery of a promotional incentive for a customer to comply with a particular behavioral pattern. However, in Gardenswartz, the customer manually supplied the registration server with information about the customer, including demographics of the customer, to generate an online profile. In Gardenswartz, the content of advertisements were selected based on changes in the customers' purchase history behaviors, but Gardenswartz is foreign to the automatic behavioral pattern analysis using customer images and computer vision algorithms in a retail store, such as the shopping path analysis of the customers in the retail store. Furthermore, Gardenswartz is foreign to the concept of forecasting the customer behavioral pattern to help customize programming content in a media network.

U.S. Pat. No. 6,385,592 of Angles, et al. (hereinafter Angles) disclosed a method and apparatus for delivering customized advertisements within interactive communication systems. In Angles, the interactive devices include computers connected to online services, interactive kiosks, interactive television systems and the like. In Angles, the advertising provider computer generated a customized advertisement based on the customer's profile, upon receiving the advertising request. In Angles, the customer, who wished to receive customized advertisement, first registered with the advertisement provider by entering the demographic information into the advertisement provider's demographic database. Therefore, Angles is foreign to the automatic forecasting of customers' behavioral pattern for the programming in a retail space based on customer behavior, without requiring any cumbersome response from the customer.

U.S. Pat. No. 6,408,278 of Carney, et al. (hereinafter Carney) disclosed a method and apparatus for delivering programming content on a network of electronic out-of-home display devices. In Carney, the network includes a plurality of display devices located in public places, and the delivered programming content is changed according to the demographics of the people. Carney also suggests demographic data gathering devices, such as kiosk and automatic teller machines. Carney is foreign to the idea of forecasting customers' behavioral patterns for the programming based on the automatic analysis of the customer's behaviors inside the store utilizing non-cumbersome automatic computer vision technology.

U.S. Pat. No. 6,484,148 of Boyd disclosed electronic advertising devices and methods for providing targeted advertisements based on the customer profiles. Boyd included a receiver for receiving identifying signals from individuals such as signals emitted by cellular telephones, and the identifying signal was used for the targeted advertisements to be delivered to the individuals. U.S. Pat. No. 6,847,969 of Mathai, et al. (hereinafter Mathai) disclosed a method and system for providing personalized advertisements to customers in a public place. In Mathai, the customer inserts a personal system access card into a slot on a terminal, which automatically updates the customer profile based on the customer's usage history. The customer profile is used for targeted advertising in Mathai. However, the usage of a system access card is cumbersome to the customer. The customer has to carry around the card when shopping, and the method and apparatus is not usable if the card is lost or stolen. U.S. Pat. No. 6,529,940 of Humble also disclosed a method and system for interactive in-store marketing, using interactive display terminals that allow customers to input feedback information to the distributed marketing messages.

Boyd, Mathai, and Humble are foreign to the idea of forecasting customers' behavioral patterns for the programming content in a media network based on the automatic analysis of the customers' behaviors inside the store utilizing non-cumbersome automatic computer vision technology.

U.S. Pat. Appl. Pub. No. 2006/0036485 of Duri, et al. (hereinafter Duri) disclosed a method and system for presenting personalized information to consumers in a retail environment using the RFID technology. Duri very briefly mentioned the computer vision techniques as a method to locate each customer, but Duri is clearly foreign to the concept of utilizing an image processing algorithm in the computer vision technologies to gather behavior analysis information of the customers to customize the programming contents in a media network.

There have been earlier attempts for understanding customers' shopping behaviors captured in a video in a targeted environment, such as in a retail store, using cameras.

U.S. Pat. Appl. Pub. No. 2006/0010028 of Sorensen (hereinafter Sorensen 1) disclosed a method for tracking shopper movements and behavior in a shopping environment using a video. In Sorensen 1, a user indicated a series of screen locations in a display at which the shopper appeared in the video, and the series of screen locations was translated to store map coordinates. The step of receiving the user input via input devices, such as a pointing device or keyboard, makes Sorensen 1 inefficient for handling a large amount of video data in a large shopping environment with a relatively complicated store layout, especially over a long period of time. The manual input by a human operator/user cannot efficiently track all of the shoppers in such cases, not to mention the possibility of human errors due to tiredness and boredom. Additionally, the manual input approach is not scalable when the number of shopping environments to handle increases.

Although U.S. Pat. Appl. Pub. No. 2002/0178085 of Sorensen (hereinafter Sorensen 2) disclosed a usage of tracking device and store sensors in a plurality of tracking systems primarily based on the wireless technology, such as the RFID. Sorensen 2 is clearly foreign to the concept of applying computer vision based tracking algorithms to the field of understanding customers' shopping behaviors and movements. In Sorensen 2, each transmitter was typically attached to a handheld or push-type cart. Therefore, Sorensen 2 cannot distinguish the behaviors of multiple shoppers using one cart from a single shopper who is also using one cart. Although Sorensen 2 disclosed that the transmitter may be attached directly to a shopper via a clip or other form of customer surrogate when a customer is shopping without a cart, this will not be practical due to the additionally introduced cumbersome steps to the shopper, not to mention the inefficiency of managing the transmitter for each individual shopper.

With regard to the temporal behavior of customers, U.S. Pat. Appl. Pub. No. 2003/0002712 of Steenburgh, et al. (hereinafter Steenburgh) disclosed a relevant prior art. Steenburgh disclosed a method for measuring dwell time of an object, particularly a customer in a retail store, which enters and exits an environment, by tracking the object and matching the entry signature of the object to the exit signature of the object, in order to find out how long the customer spent in a retail store.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the object included customers. Pavlidis was primarily related to monitoring a search area for surveillance, but Pavlidis also included itinerary statistics of customers in a department store.

U.S. Pat. Appl. Pub. No. 2004/0120581 of Ozer, et al. (hereinafter Ozer) disclosed a method for identifying activity of customers for marketing purpose or activity of objects in a surveillance area, by comparing the detected objects with the graphs from a database. Ozer tracked the movement of different object parts and combined them to high-level activity semantics, using several Hidden Markov Models (HMMs) and a distance classifier. U.S. Pat. Appl. Pub. No. 2004/0131254 of Liang, et al. (hereinafter Liang) also disclosed the Hidden Markov Models (HMMs) as a way to characterize behavior, particularly animal behavior, along with the rule-based label analysis and the token parsing procedure. Liang disclosed a method for monitoring and classifying actions of various objects in a video, using background subtraction for object detection and tracking. Liang is particularly related to animal behavior in a lab for testing drugs.

With regard to path analysis, an exemplary disclosure can be found in U.S. Pat. No. 6,584,401 of Kirshenbaum, et al. (hereinafter Kirshenbaum), which disclosed a method and apparatus for automatically gathering data on paths taken by commuters for the sake of improving the commute experience. Kirshenbaum disclosed a global positioning system, mobile phone, personal digital assistant, telephone, PC, and departure or arrival indications as some ways for gathering the commute data. Clearly, Kirshenbaum is foreign to the concept of analyzing the customers' behaviors automatically based on visual information of the customers using the means for capturing images, such as the shopping path tracking and analysis, for the sake of delivering targeted advertisement content to a display in a retail store.

U.S. Pat. Appl. Pub. No. 2003/0058339 of Trajkovic, et al. (hereinafter Trajkovic) disclosed a method for detecting an event through repetitive patterns of human behavior. Trajkovic learned multidimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic is clearly foreign to the event detection for the aggregate of non-repetitive behaviors, such as the shopper traffic in a physical store. The shopping path of an individual shopper can be repetitive, but each shopping path in a group of aggregated shopping paths of multiple shoppers is not repetitive. Trajkovic did not disclose the challenges in the event detection based on customers' behaviors in a video in a retail environment such as the non-repetitive behaviors, and Trajkovic is clearly foreign to the challenges that can be found in a retail environment.

While the above mentioned prior arts try to deliver targeted advertising contents to the customers in a computer network, television network, or a standalone system, using customer profiles, customer purchase history, demographic information from customers, various devices and tools, or non-automatic information collection methods, such as questionnaires, registration forms, or electronic devices from the customers, they are clearly foreign to the automatic forecasting of customers' behavioral patterns in a retail space based on the customers' behavioral statistics and classification, such as the shopping paths information in the store, without requiring any cumbersome involvement from the customer, using an efficient computer vision technology on the customers' images.

In the present invention, the term "programming" is defined as any media content that is delivered to the sites in a particular media network, including any advertisement, public announcement, informational message, promotional content, marketing content, and educational content. Therefore, the term programming in the present invention includes a much broader concept of content than a mere advertisement content. In this context, the prior arts are especially foreign to the concept of providing forecasting information to help customize the programming content, rather than just advertisement content, in a media network based on automatic behavior analysis by computer vision algorithms.

The present invention is a method and system for forecasting the behavioral characterization of customers to help customize programming contents on each node, defined as means for playing output, of each site of a plurality of sites in a media network through automatically measuring, characterizing, and forecasting the behavioral information of customers that appear in the vicinity of each means for playing output, using a plurality of image capturing devices and a plurality of computer vision technologies on the visual information, which solves the aforementioned problems in the prior art. It is an objective of the present invention to provide an efficient and robust solution that solves the aforementioned problems in the prior art. The present invention is called behavior-based programming (BBP).

Computer vision algorithms have been shown to be an effective means for detecting and tracking people. These algorithms also have been shown to be effective in analyzing the behavior of people in the view of the means for capturing images. This allows for the possibility of connecting the visual information from a scene to the behavior and content of advertising media. The invention allows freedom of installation position between data gathering devices, a set of cameras, and display devices. The invention automatically and unobtrusively analyzes the customer behavior without involving any hassle of feeding information manually by the customer. The present invention does not require the customer to carry any cumbersome device.

Another limitation found in the prior arts is that the data gathering device is often collocated adjacent to the display device in the prior art. However, depending on the public place environment and the business goal, where the embodiment of the system is installed, it may be necessary to install the data gathering devices independent of the position of the display device. For example, some owners of public places could want to utilize the widely used and already installed surveillance cameras in their public places for the data gathering. In this situation, the surveillance cameras may not necessarily be collocated adjacent to the display devices.

The BBP enables the separation of the device locations, which makes the layout of equipment installation flexible. In the above exemplary cases, the BBP enables the targeted content to be delivered and displayed through display devices, which do not need to be collocated adjacent to the data gathering devices, such as cameras.

SUMMARY

The present invention is a method and system for forecasting the behavioral characterization of customers to help customize programming contents on each means for playing output of each site of a plurality of sites in a media network through automatically measuring, characterizing, and forecasting the behavioral information of customers that appear in the vicinity of each means for playing output, using a plurality of image capturing devices and a plurality of computer vision technologies on the visual information. The present invention is called behavior-based programming (BBP).

The BBP provides tailored audience measurement steps for media networks in public spaces. The steps provide an understanding of audience behavior composition and aid in the matching of content to specific targeted groups. The BBP leverages a proprietary automated behavioral classification as well as its sampling, characterization and forecasting methods.

The exemplary embodiment of the BBP works in concert with network owners and operators to gain a full understanding of each network to be characterized. Next, the exemplary embodiment selects a representative sample of nodes that reflects the breadth and variety of the nodes in the network. This selection process considers variables such as screen classes, geographic markets, site types, screen placements, etc. In another exemplary embodiment, it is possible that the invention can measure the behavioral statistics from all the nodes rather than sample nodes. Whether the measurement is performed at the sample nodes or entire nodes may be influenced by a plurality of variables, such as the complexity of the targeted measurement data, the goal of the market, and the size of the media network.

Measurement of the audience for the group of sample screens is carried out using an automated, computer vision based media measurement and behavioral segmentation system. These systems are installed in the vicinity of each node in the measured nodes, and statistics about each node's addressable audience and that audience's behavioral characteristics are collected. In the BBP, the attachment of these systems to each node is logically defined. Therefore, the BBP allows a certain degree of flexibility in the installation locations between these systems and the nodes.

Using statistical methods, the embodiment can provide network-wide and node-level characterizations for each node in the network based on the measurements obtained at the nodes. Characterizations are provided for a given window of time, and detail a node's audience behavioral statistics for that time increment. These characterizations provide the basis for validating current media content, its relevance to the current audience, and forecasting of the audience behavior composition for more targeted future media purchases and placements.

Based on the screen-level characterization of the network, derived from actual measurements of audience behavioral statistics over a given period, the invention forecasts the screen and network characterization. The forecasting can also be modified based on past characterization data, seasonal and other trends in an embodiment.

It is an object of the present invention to analyze the customers' behavioral information automatically without requiring any cumbersome involvement or feedback from the customers.

It is a further object of the present invention to remove the use of any physical devices or media, such as cellular telephone, personal digital assistant (PDA), ATM machine, Kiosk, terminal keypad, online feedback, survey form, registration form, questionnaire, bar-coded card, identification card, radio frequency identification (RFID), or access card, for analyzing the customers' behavioral information in the public space of a media network.

It is another object of the present invention to use the visual information of the customers to automatically analyze the behavioral information of the customers, with a plurality of image capturing devices and a plurality of computer vision technologies.

It is a further object of the present invention to generate the characterization of the behavioral statistics in the customer profiles, which are used for forecasting and customizing the programming contents in a media network, purely based on the automatic analysis of the customers' behavioral information in a public space in a media network.

In a preferred embodiment, the installation location of the means for capturing images is not limited by the installation location of the means for playing output for the customized programming contents.

DRAWINGS—FIGURES

FIG. 1 is an overview of an application of a preferred embodiment of the invention in a site of a plurality of sites in a media network, where the present invention automatically tracks and analyzes the behavior of a customer through the path the customer took in a site. A media server distributes the customized programming contents to each node in the site based on the automatic forecasting of the behavioral pattern for the customer by the present invention.

FIG. 2 is an overview of an application of another preferred embodiment of the invention, where the present invention automatically tracks and analyzes the behavior of a group of customers through the paths the group of customers took in a site. A media server can distribute the customized programming contents to each node in the site based on the automatic forecasting of the behavioral pattern of the group of customers in this exemplary embodiment.

FIG. 3 is a layout view of another embodiment of the invention in a site, which shows an exemplary path analysis for a customer in a specific section of a site, where the customer in the specific section is tracked through arrays of means for capturing images in an exemplary embodiment of the present invention.

FIG. 4 is a layout view of another embodiment of the invention in a site, which shows an exemplary path analysis in a site, where a customer and each customer in a group of customers in the store are tracked and the behavior of the customer and the group of customers can be categorized based on multiple behavioral pattern attributes through arrays of means for capturing images in an exemplary embodiment of the present invention.

Figure 8:
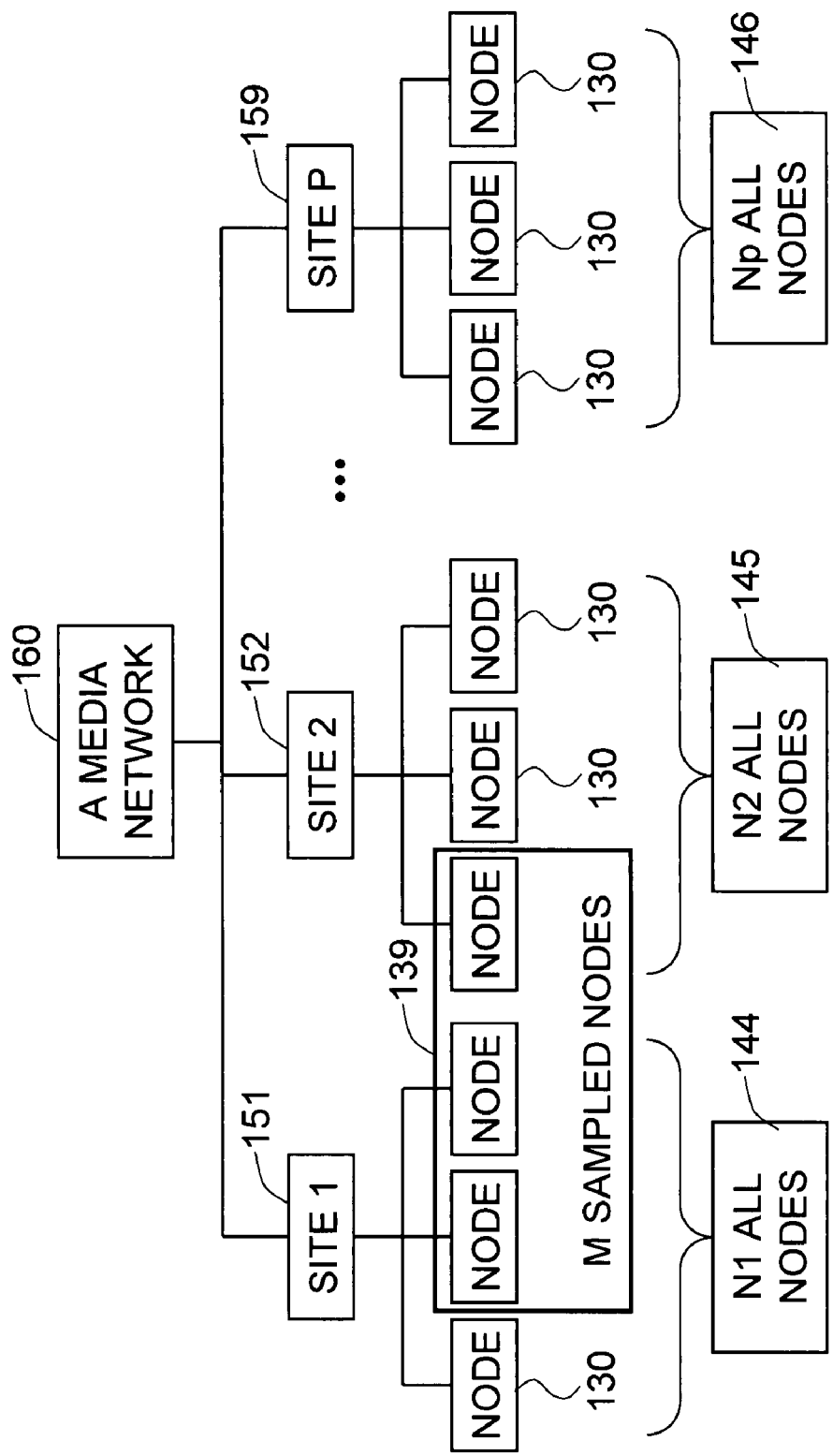

FIG. 8 further shows the hierarchy of another exemplary media network with an exemplary embodiment of the invention, where the media network consists of a plurality of sites, and some of the nodes across the media network are sampled for the behavioral statistics measurement.

Figure 9:
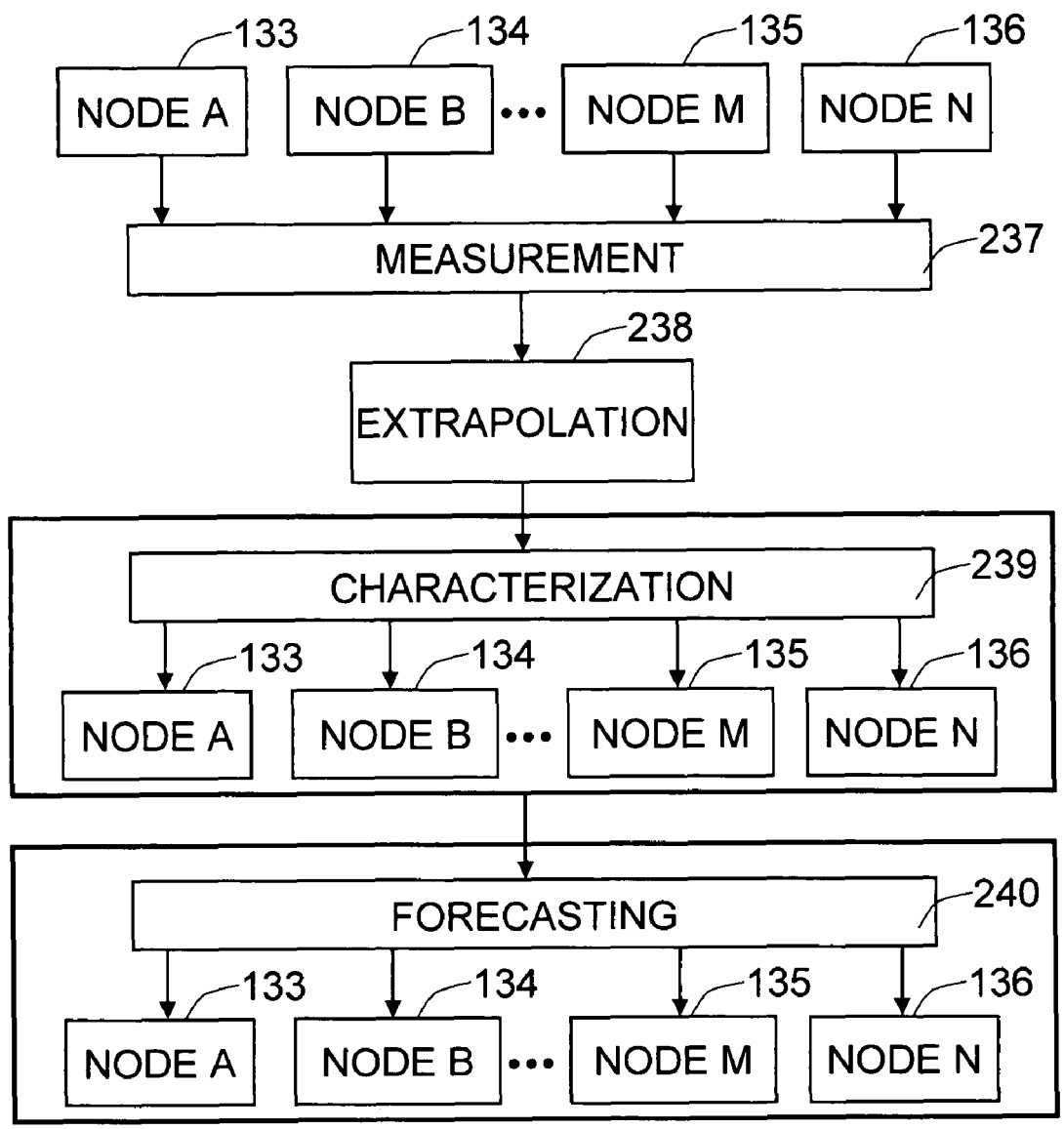

FIG. 9 shows exemplary steps in an exemplary embodiment of the invention, where the steps consist of the automatic behavioral statistics measurement from all the nodes in each site of a media network, the extrapolation of the measurement, the characterization of the behavioral information for each node, and the forecasting of the behavioral characterization to help customize programming contents for each node.

Figure 10:
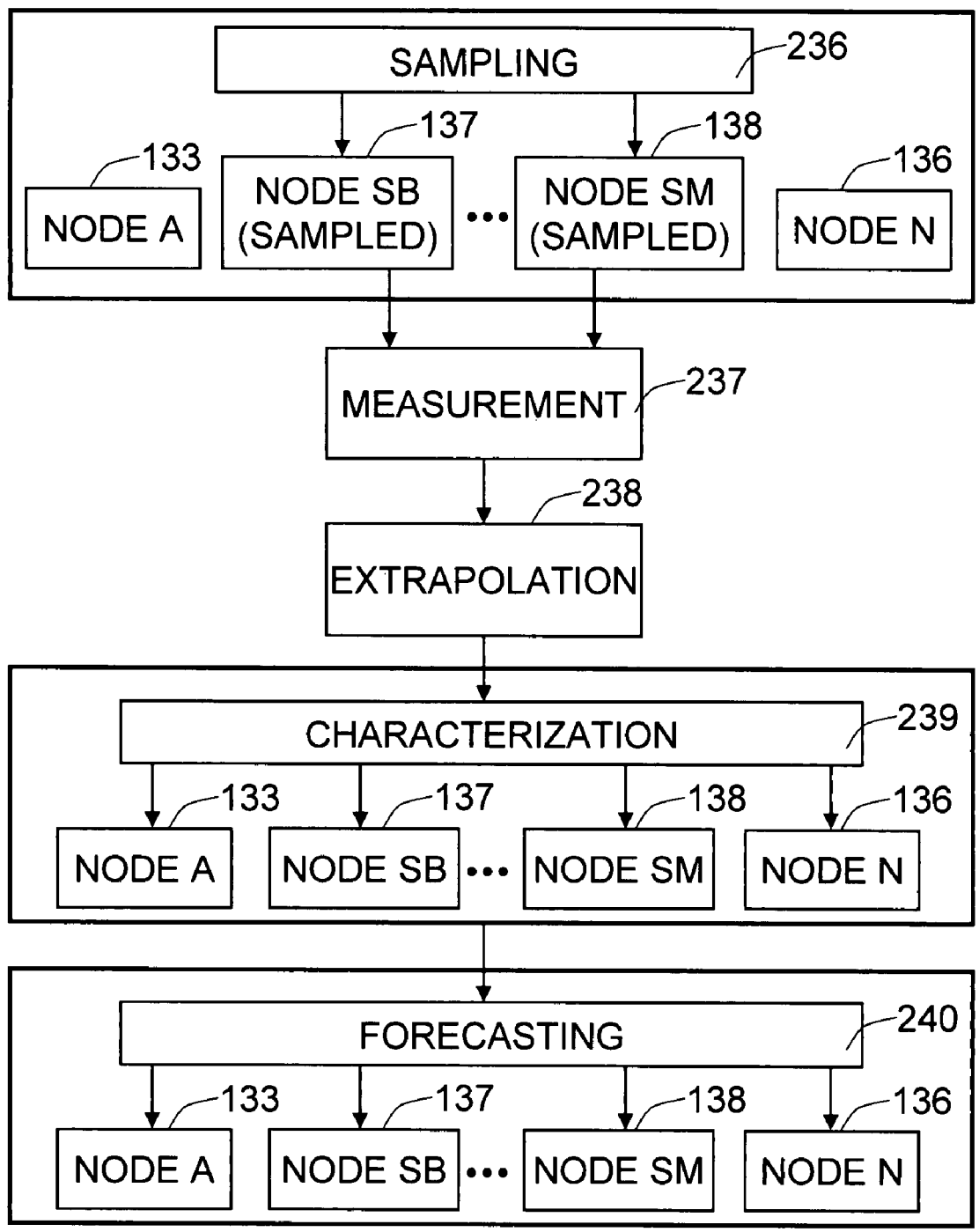

FIG. 10 shows exemplary steps in another exemplary embodiment of the invention, where the steps consist of the automatic behavioral statistics measurement from the sampled nodes in a media network, the extrapolation of the measurement, the characterization of the behavioral information for each node, and the forecasting of the behavioral characterization to help customize programming contents for each node.

Figure 11:
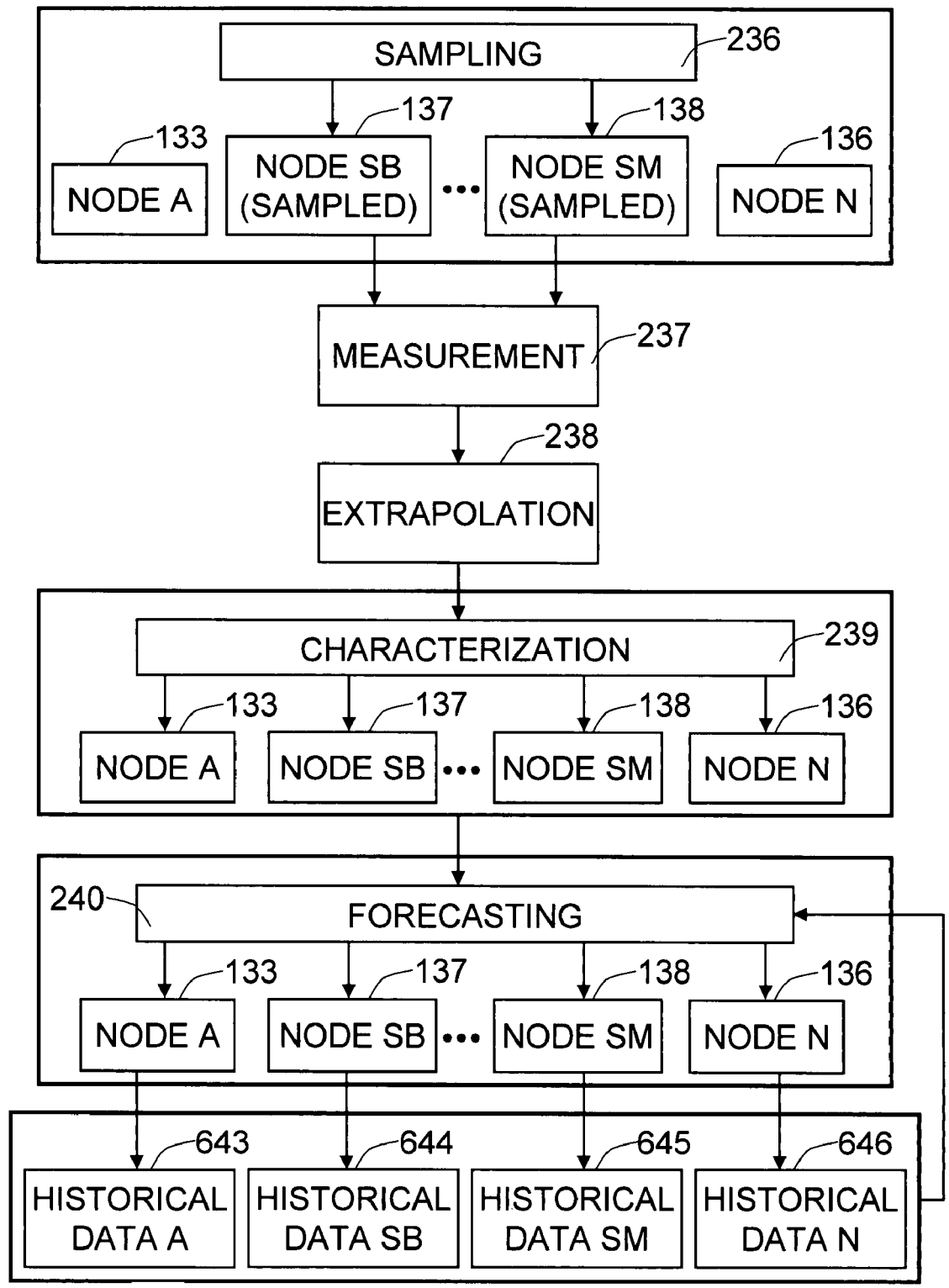

FIG. 11 shows exemplary steps in another exemplary embodiment of the invention, where the steps consist of the automatic behavioral statistics measurement from the sampled nodes in a media network, the extrapolation of the measurement, the characterization of the behavioral information for each node, the forecasting of the behavioral characterization to help customize programming contents for each node, the record keeping of the forecasting information in each node, and the utilization of the historical forecasting information record to modify the current forecasting step.

Figure 12:
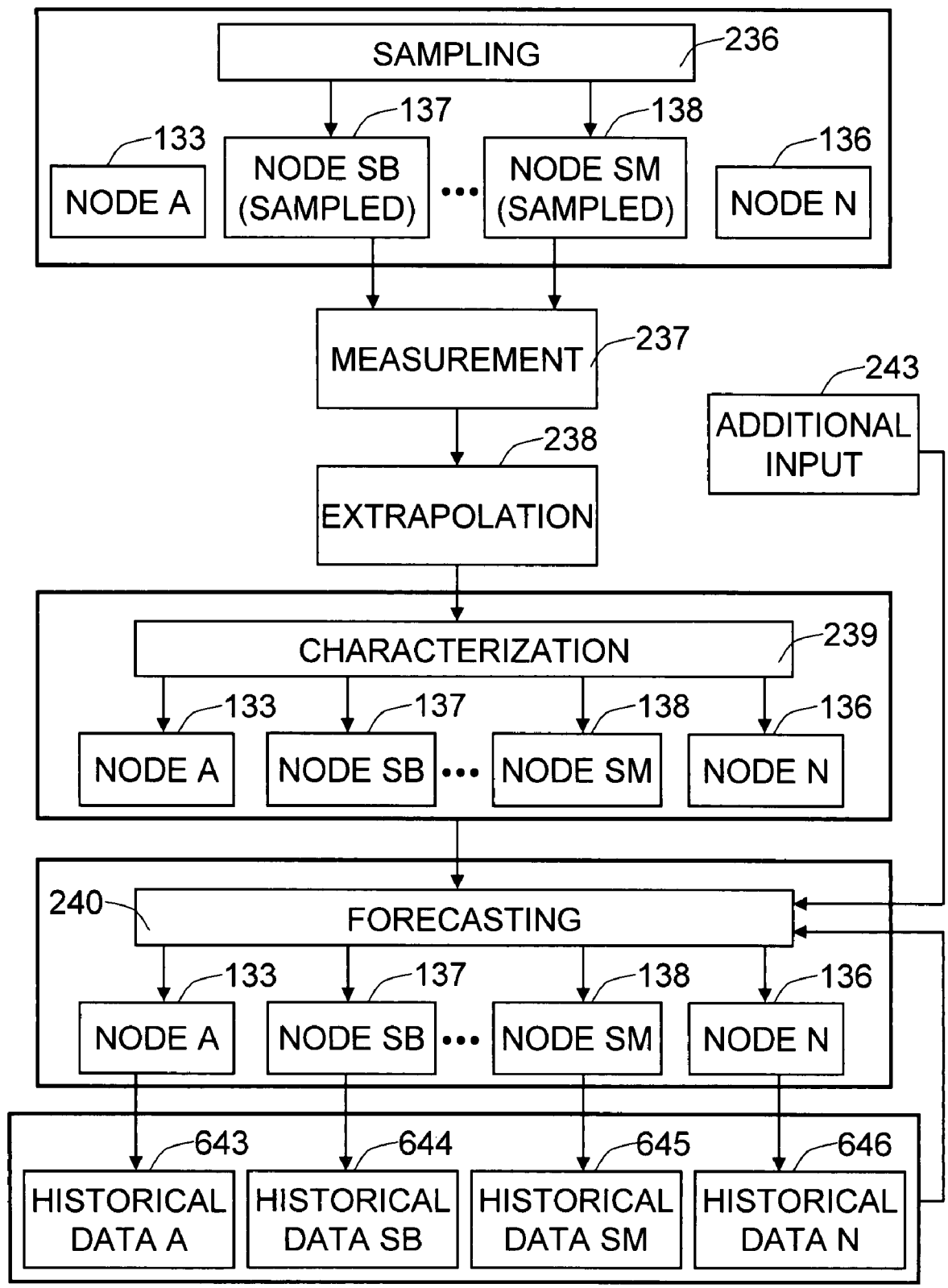

FIG. 12 shows exemplary steps in another exemplary embodiment of the invention, where the steps consist of the automatic behavioral statistics measurement from the sampled nodes in a media network, the extrapolation of the measurement, the characterization of the behavioral information for each node, the forecasting of the behavioral characterization to help customize programming contents for each node, the record keeping of the forecasting information in each node, the utilization of the historical forecasting information record to modify the current forecasting step, and the utilization of additional input to modify the current forecasting step.

Figure 13:
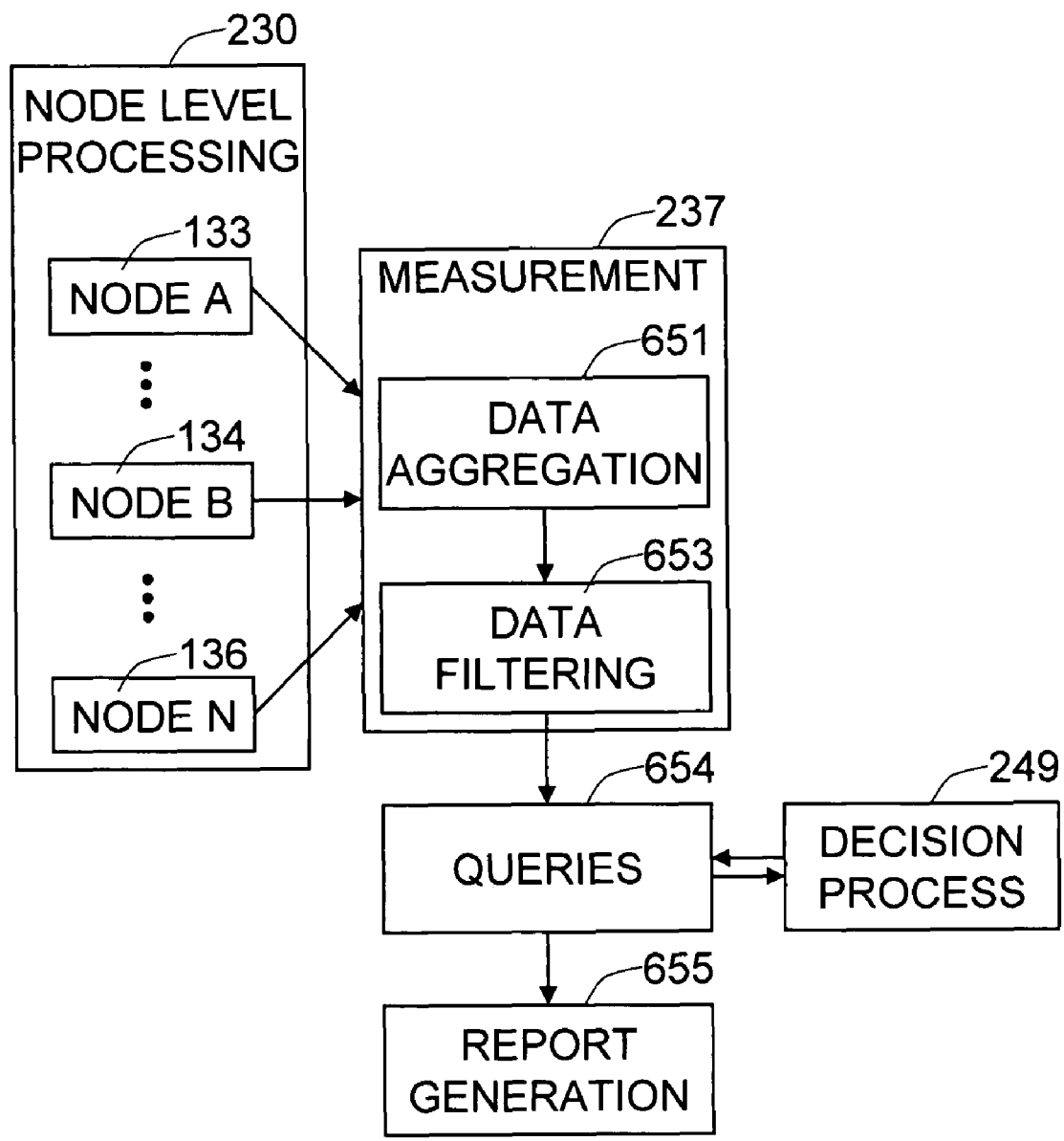

FIG. 13 shows an exemplary embodiment of the behavioral statistics measurement and exemplary method for generating a useful marketing report to the decision maker in a site or a media network through queries.

Figure 14:
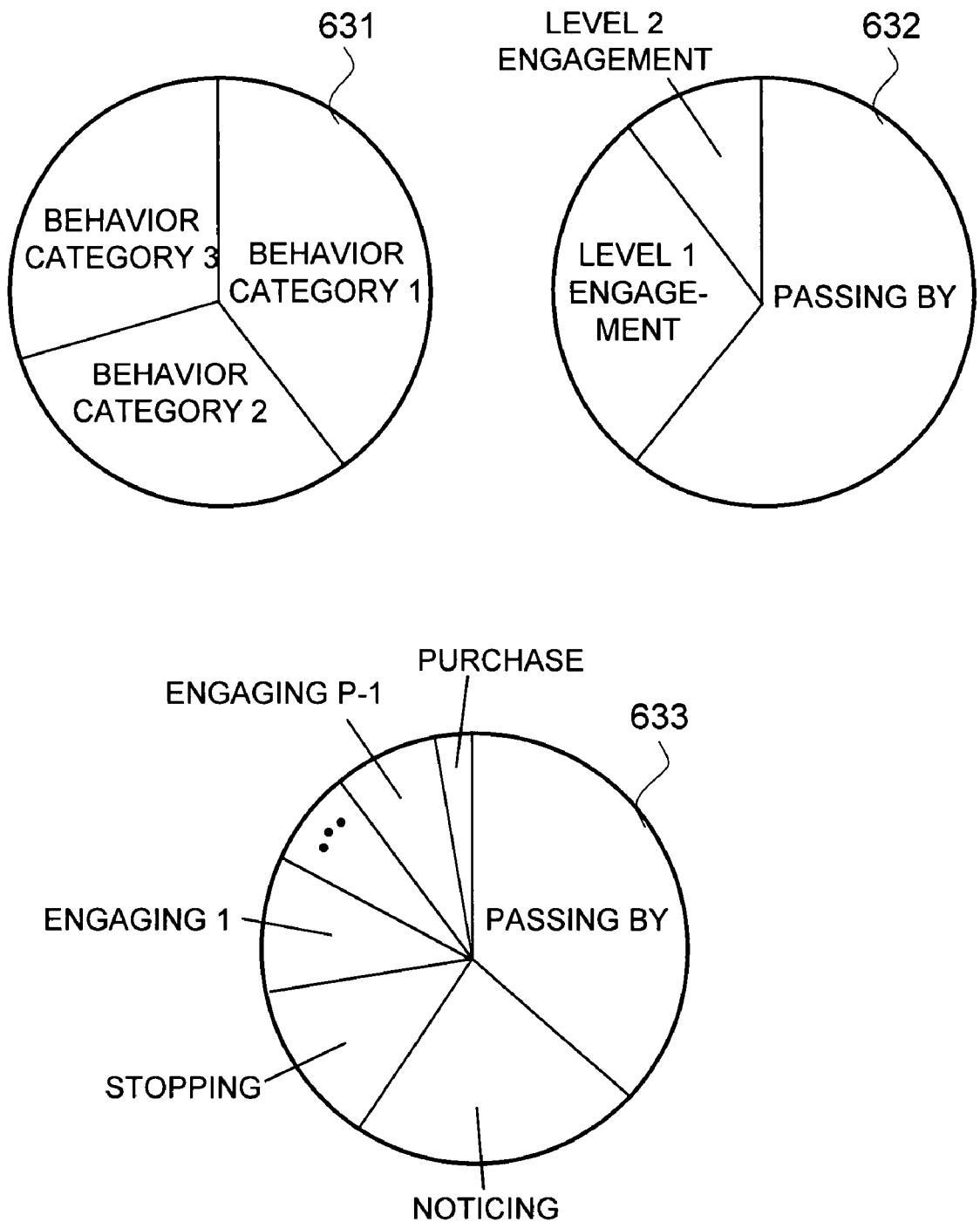

FIG. 14 shows exemplary pie charts of the exemplary behavioral information measurement from a means for capturing images, where the pie charts provide useful characterization and forecasting information to the decision maker in a site or a media network.

FIG. 15 shows exemplary statistics of the behavioral information for each node in each site in a plurality of sites in a media network.

Figure 16:
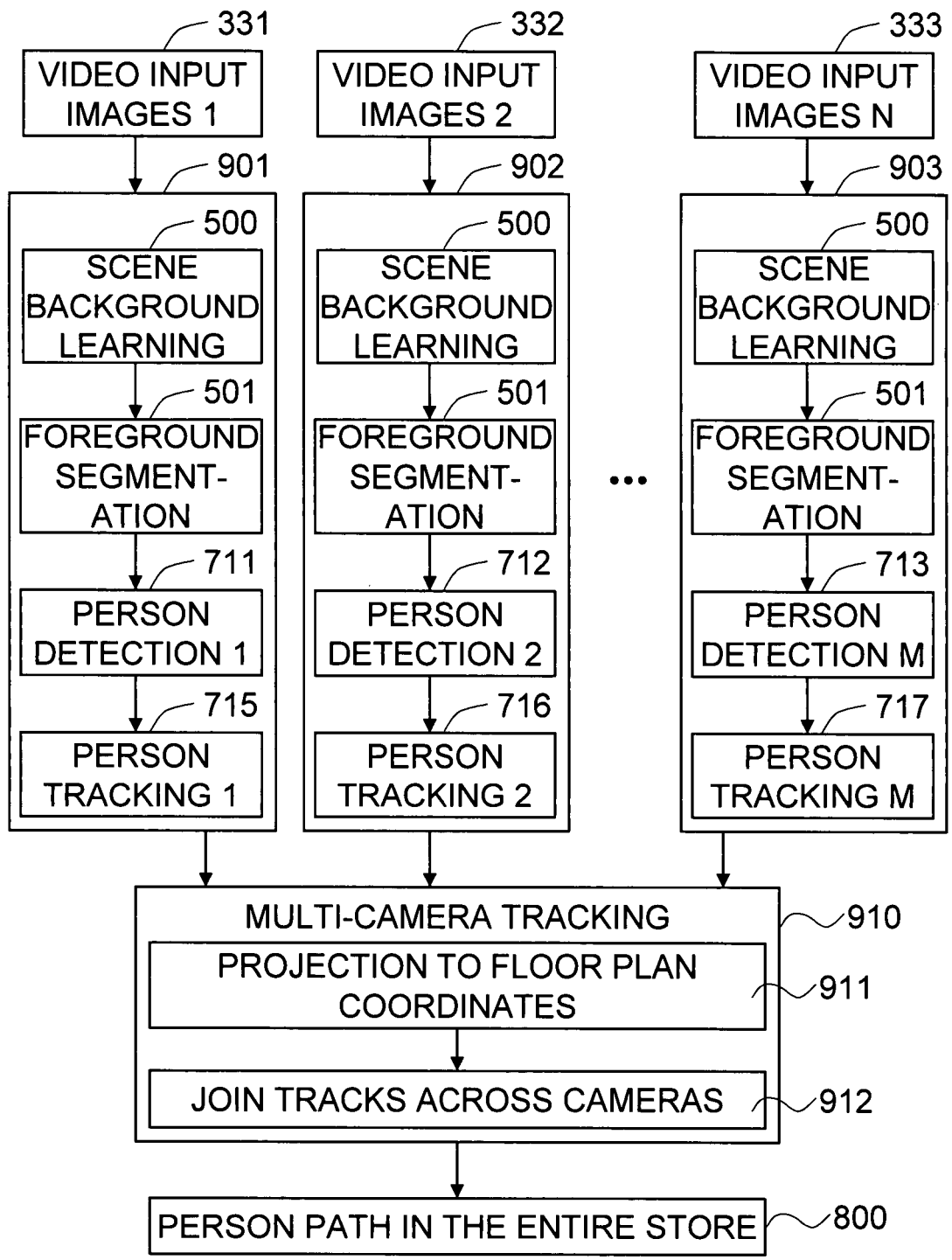

FIG. 16 shows an exemplary process of tracking and behavior analysis for a single customer or a group of customers using multiple means for capturing images in a preferred embodiment of the invention.

FIG. 17 shows an exemplary match process between a blob of foreground pixels with a template representing the size and shape of a person at a given location in a preferred embodiment of the invention.

Figure 18:
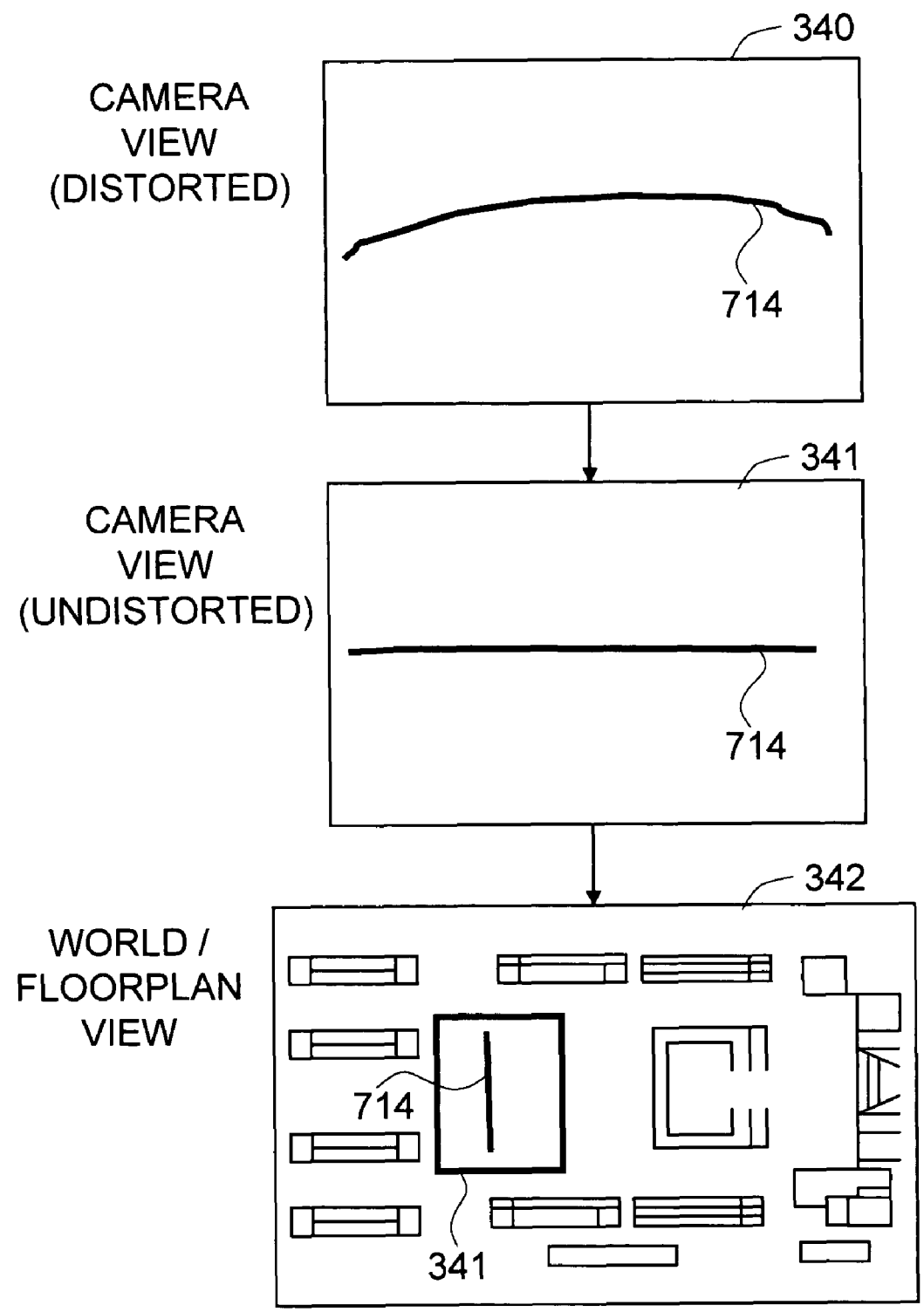

FIG. 18 shows an exemplary process of correcting the tracks to account for camera and lens-specific distortion in a preferred embodiment of the invention.

Figure 19:
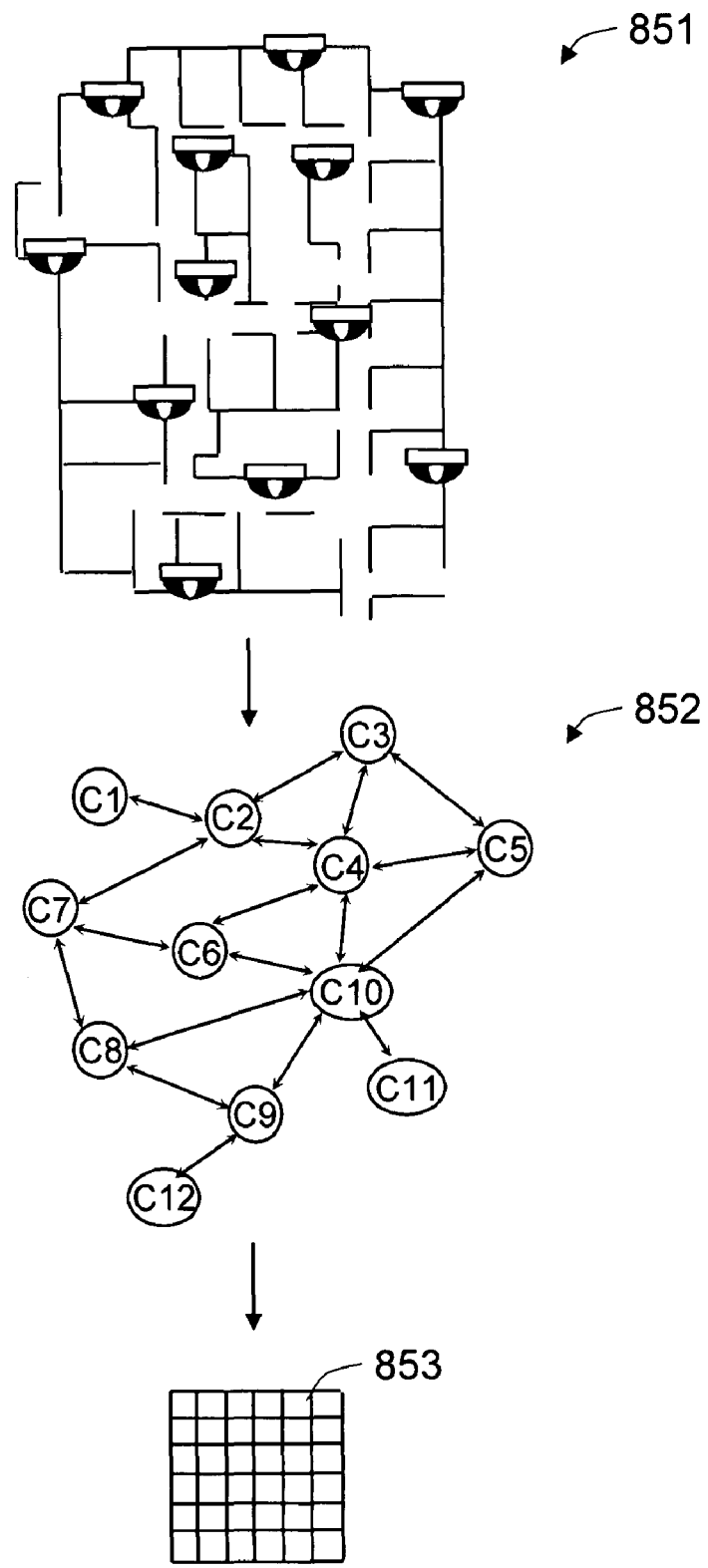

FIG. 19 shows an exemplary network of a plurality of means for capturing images and correspondences between tracks across the plurality of means for capturing images in a preferred embodiment of the invention.

Figure 20:
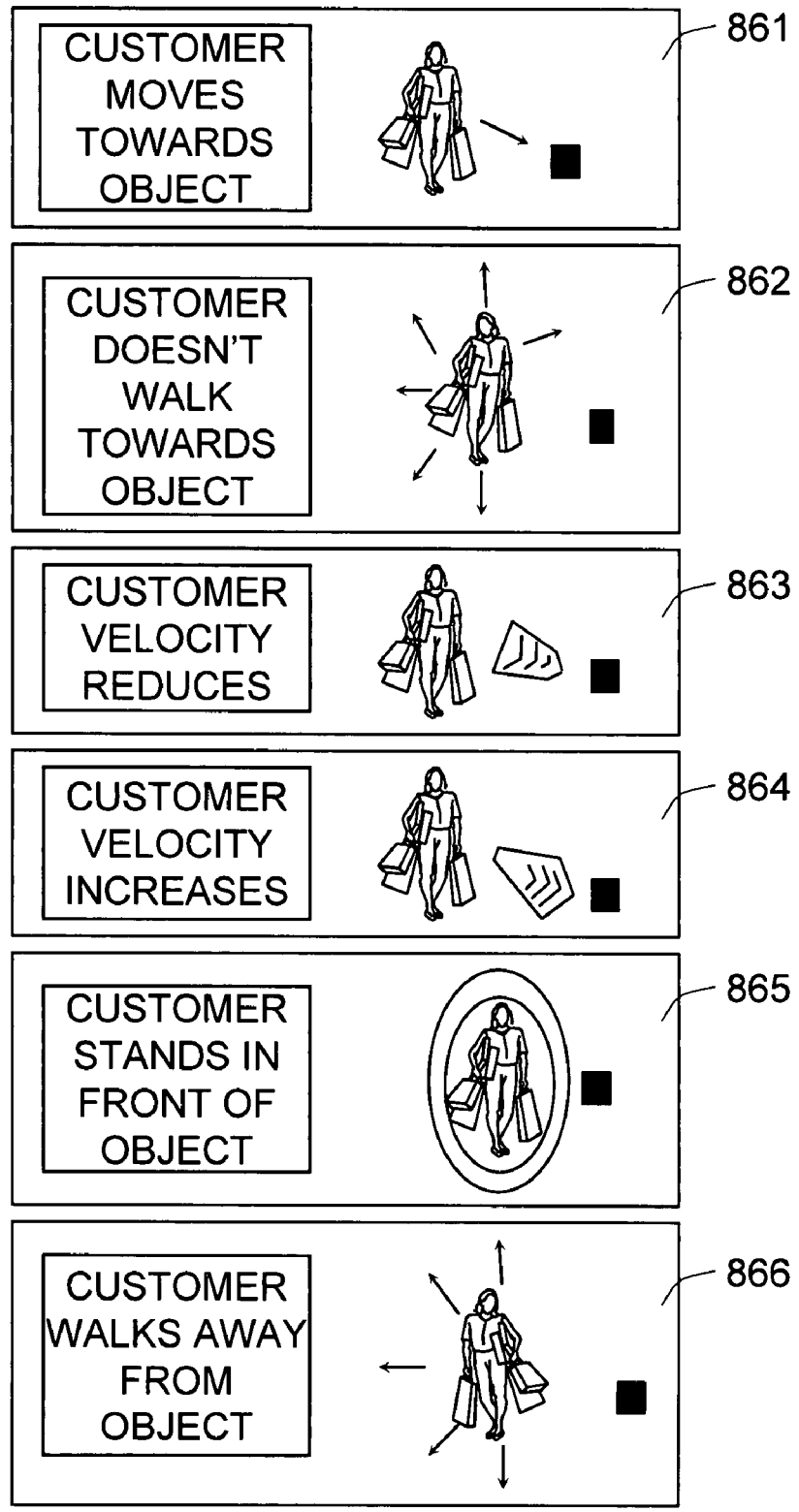

FIG. 20 shows exemplary spatio-temporal primitives for modeling human-object behavior in retail enterprises, where a preferred embodiment of the invention is often installed.

FIG. 21 shows exemplary shopping interaction levels in a target physical space that are observed to produce the behavioral analysis.

Figure 22:
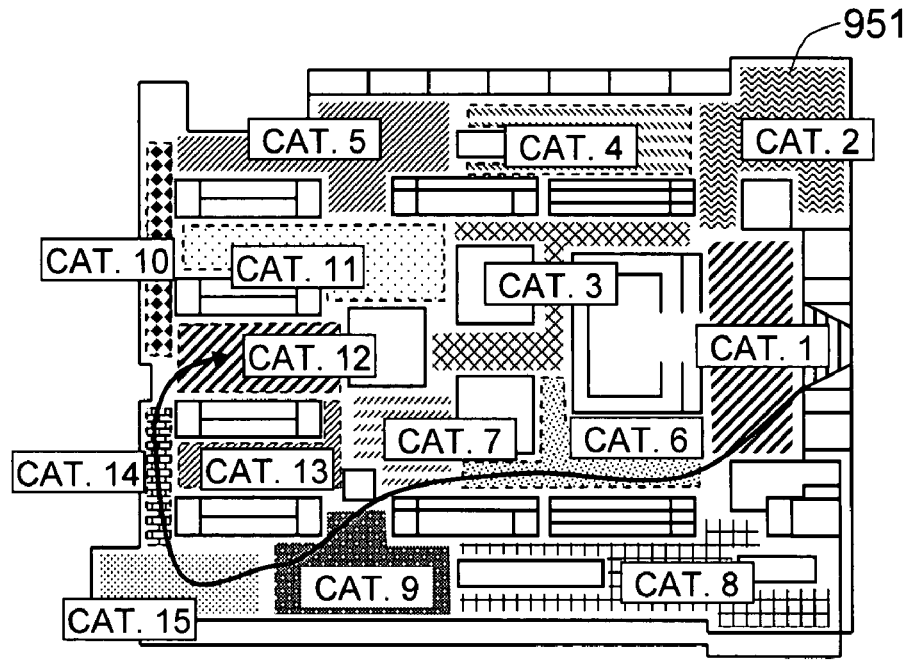

FIG. 22 shows exemplary layout of a plurality of categories in a site for an exemplary behavior analysis and an exemplary table for category sequence measurement among the plurality of categories.

FIG. 23 shows an exemplary behavior measurement among a plurality of nodes in a site during a window of time through a plurality of exemplary tables for behavior measurement.

FIG. 24 shows an exemplary behavior measurement for an exemplary node for a plurality of different windows of time through a plurality of exemplary tables for behavior measurement.

Figure 25:
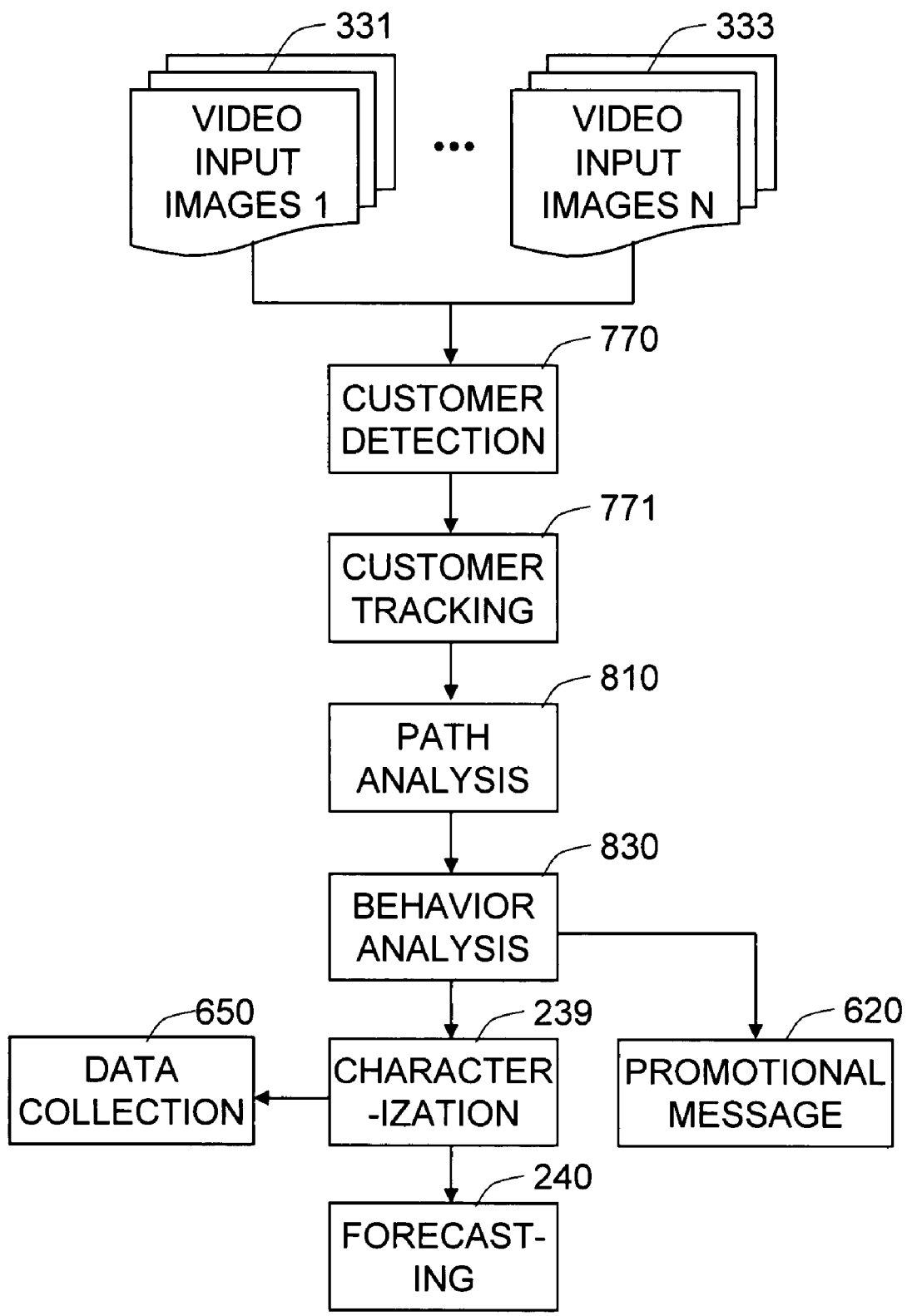

FIG. 25 shows an exemplary process of single customer tracking and behavior analysis in a preferred embodiment of the invention.

Figure 26:
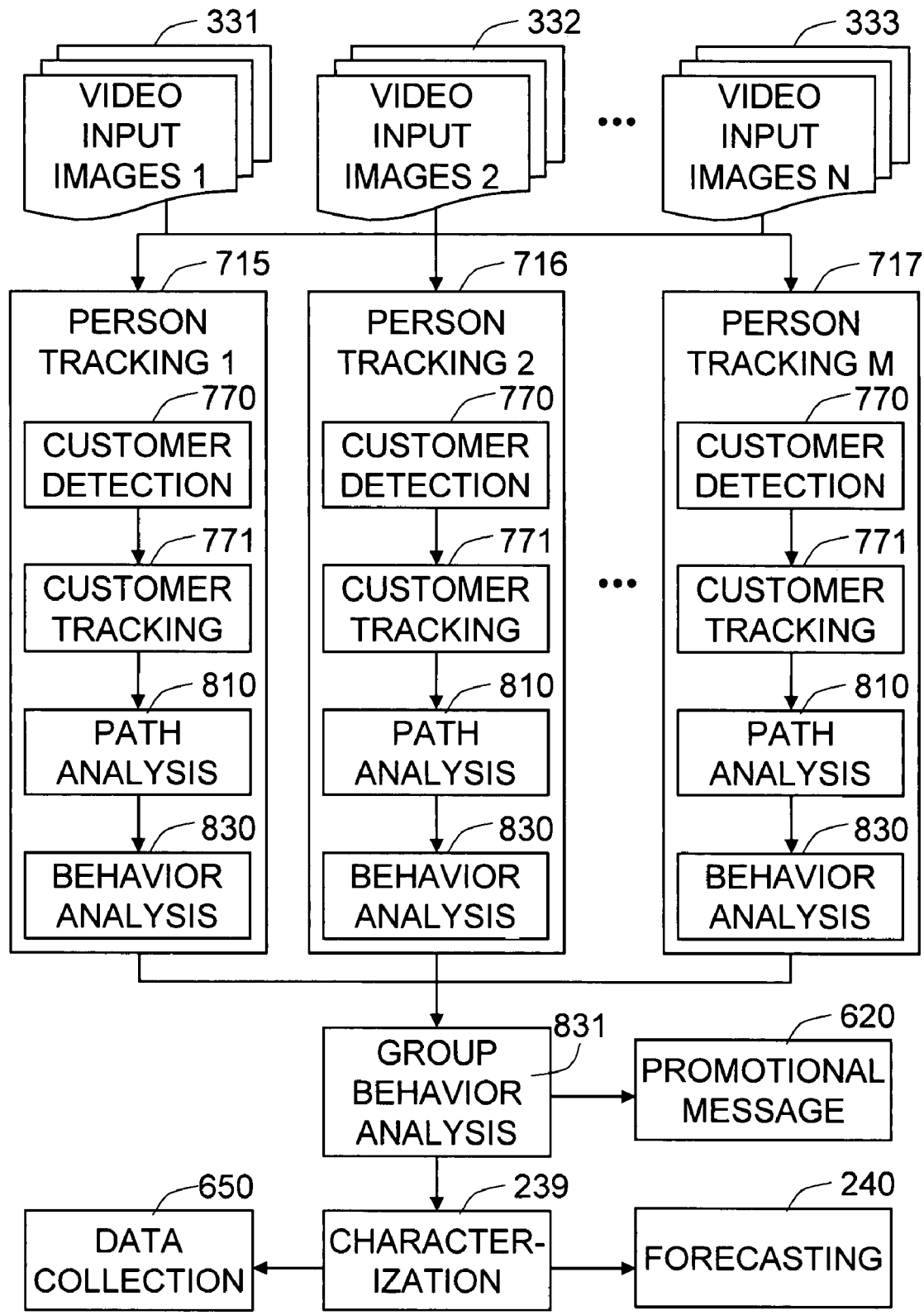

FIG. 26 shows an exemplary process of tracking and behavior analysis for a group of customers in a preferred embodiment of the invention.

Figure 27:
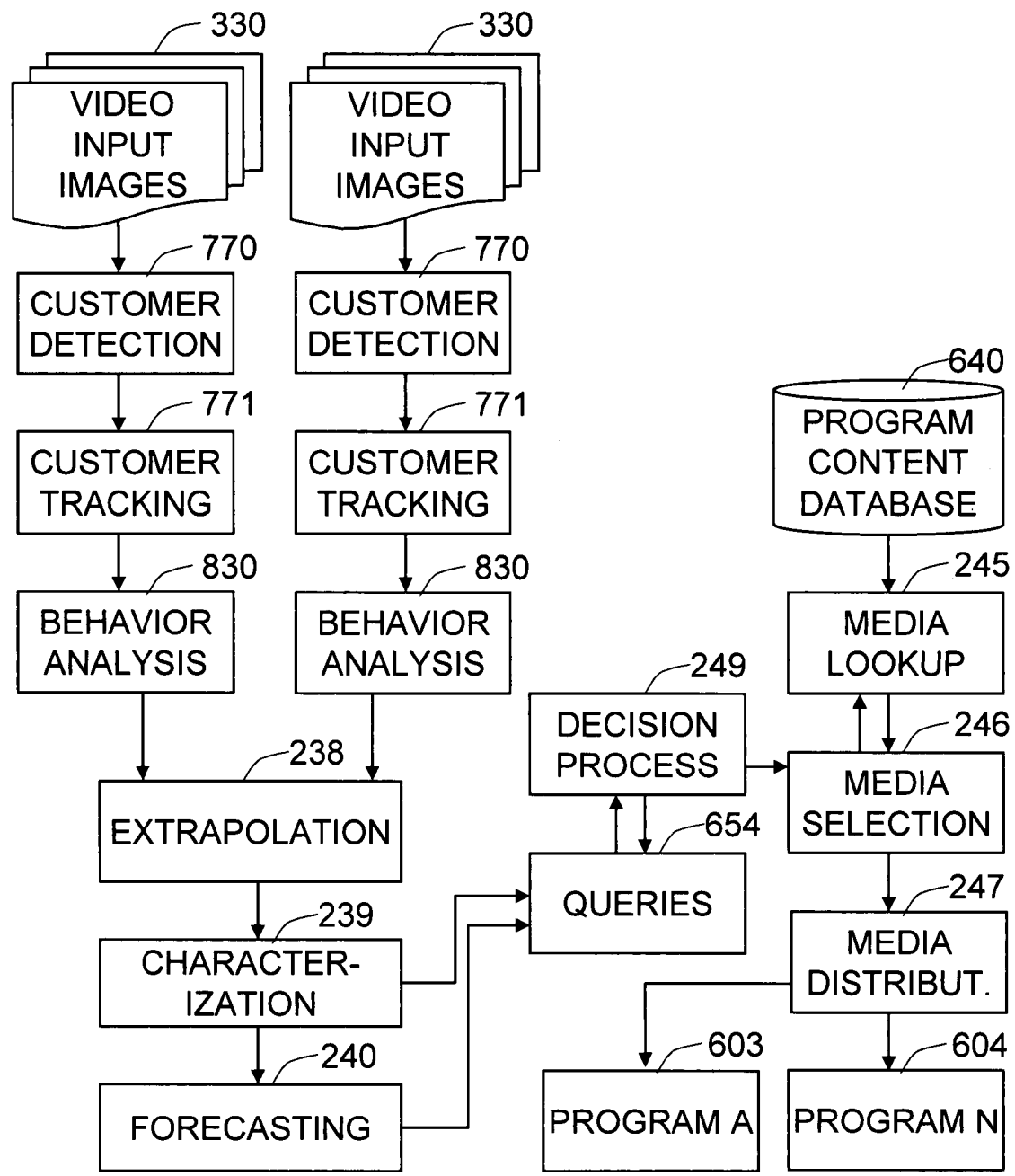

FIG. 27 shows an exemplary flow of key processes in an exemplary embodiment of the invention, where the characterization and forecasting results are reported to the decision maker of a site or a media network through queries, so that the decision maker manually selects the programming contents based on the characterization and forecasting results and makes a decision about the distributed programming contents.

Figure 28:
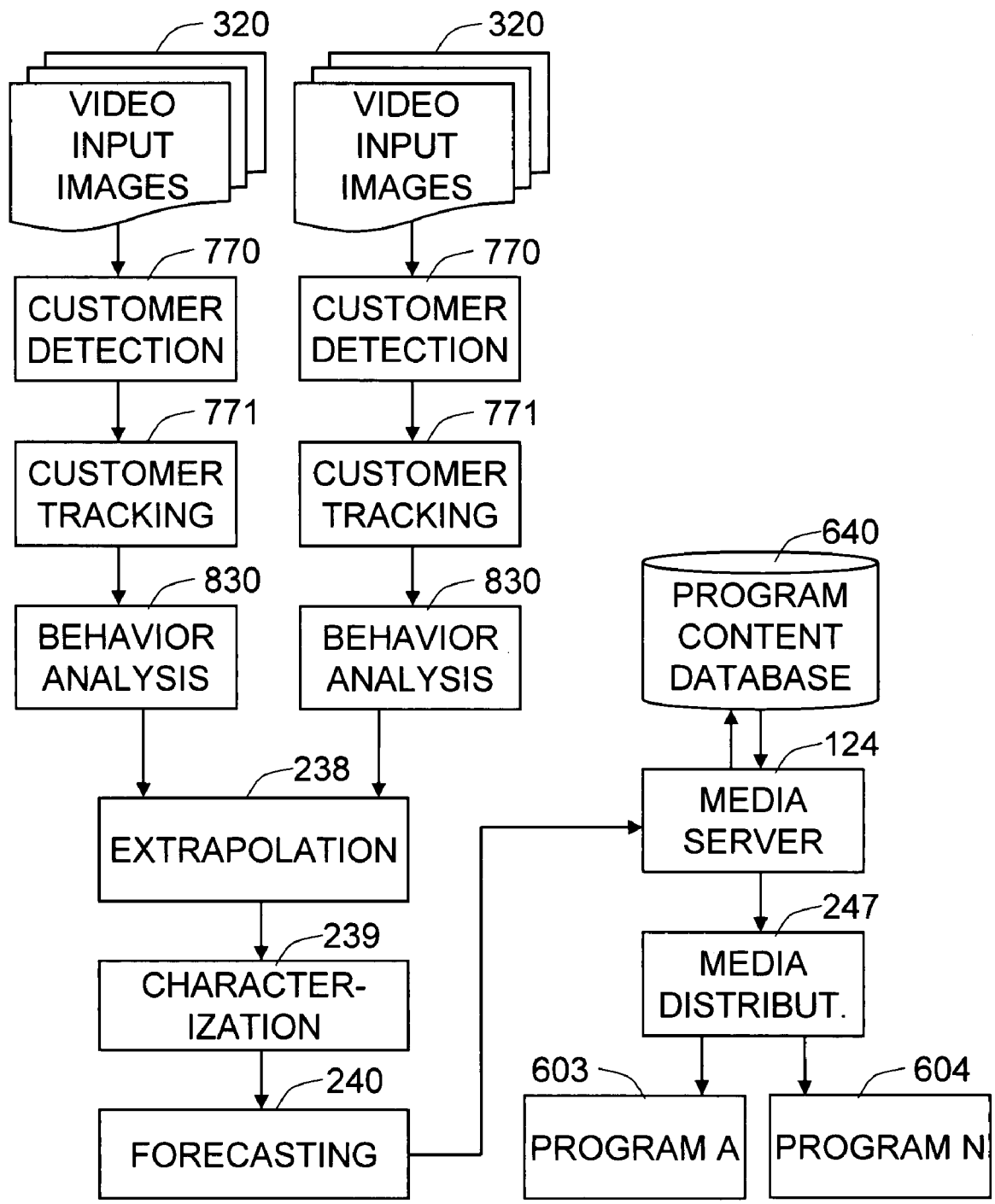

FIG. 28 shows an exemplary flow of key processes in another exemplary embodiment of the invention, where the forecasting is passed to the media server rather than the decision maker of a site or a media network, so that the distribution of the forecast programming contents is processed automatically by the media server.

Figure 29:
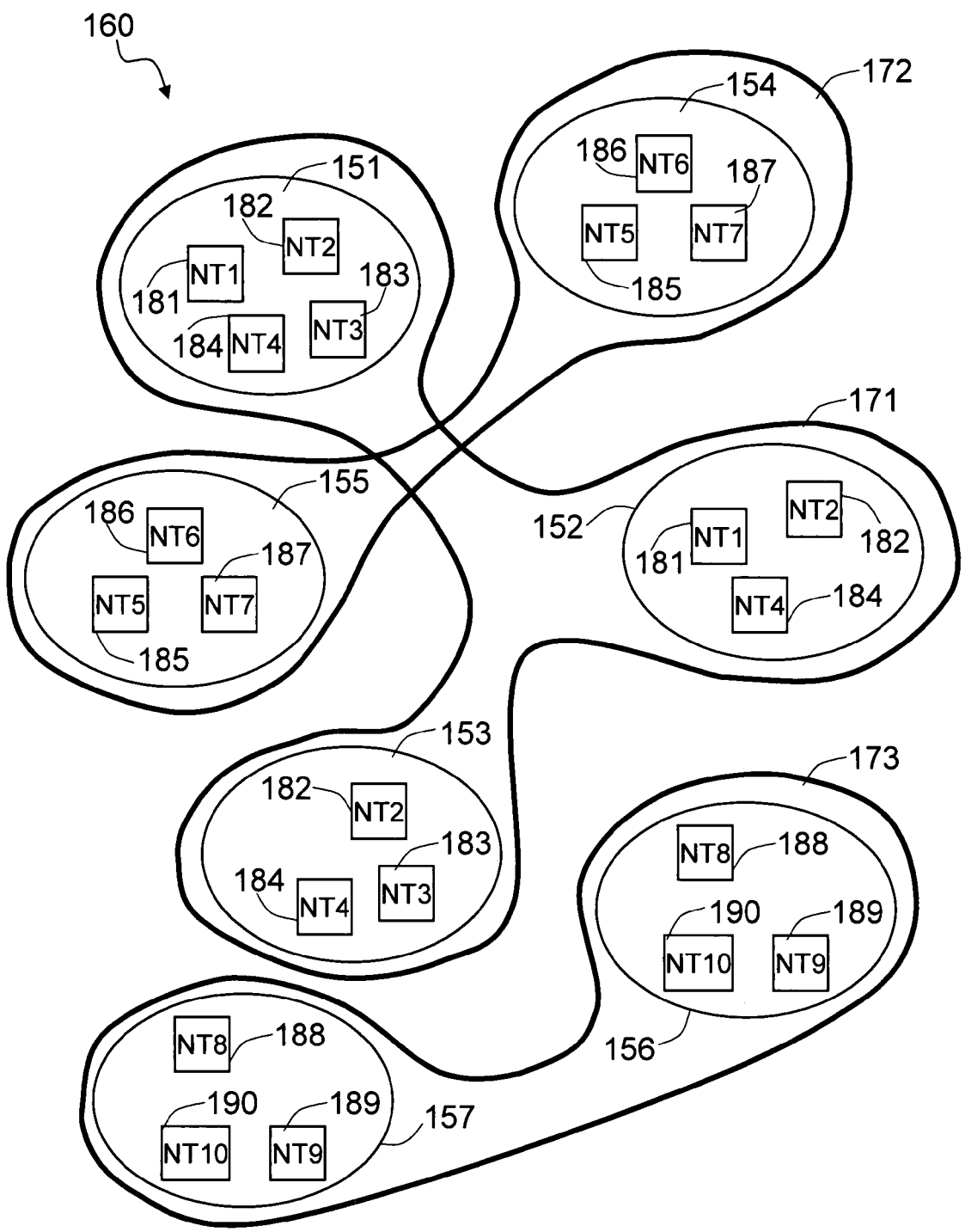

FIG. 29 shows an exemplary clustering of sites based on point of sale (POS) data and store layout as a part of the exemplary extrapolation process.

FIG. 30 shows an exemplary table for the category of clustered sites and an exemplary table for node type and information for the exemplary extrapolation process in the BBP based on the clustering of the sites.

Figure 31:
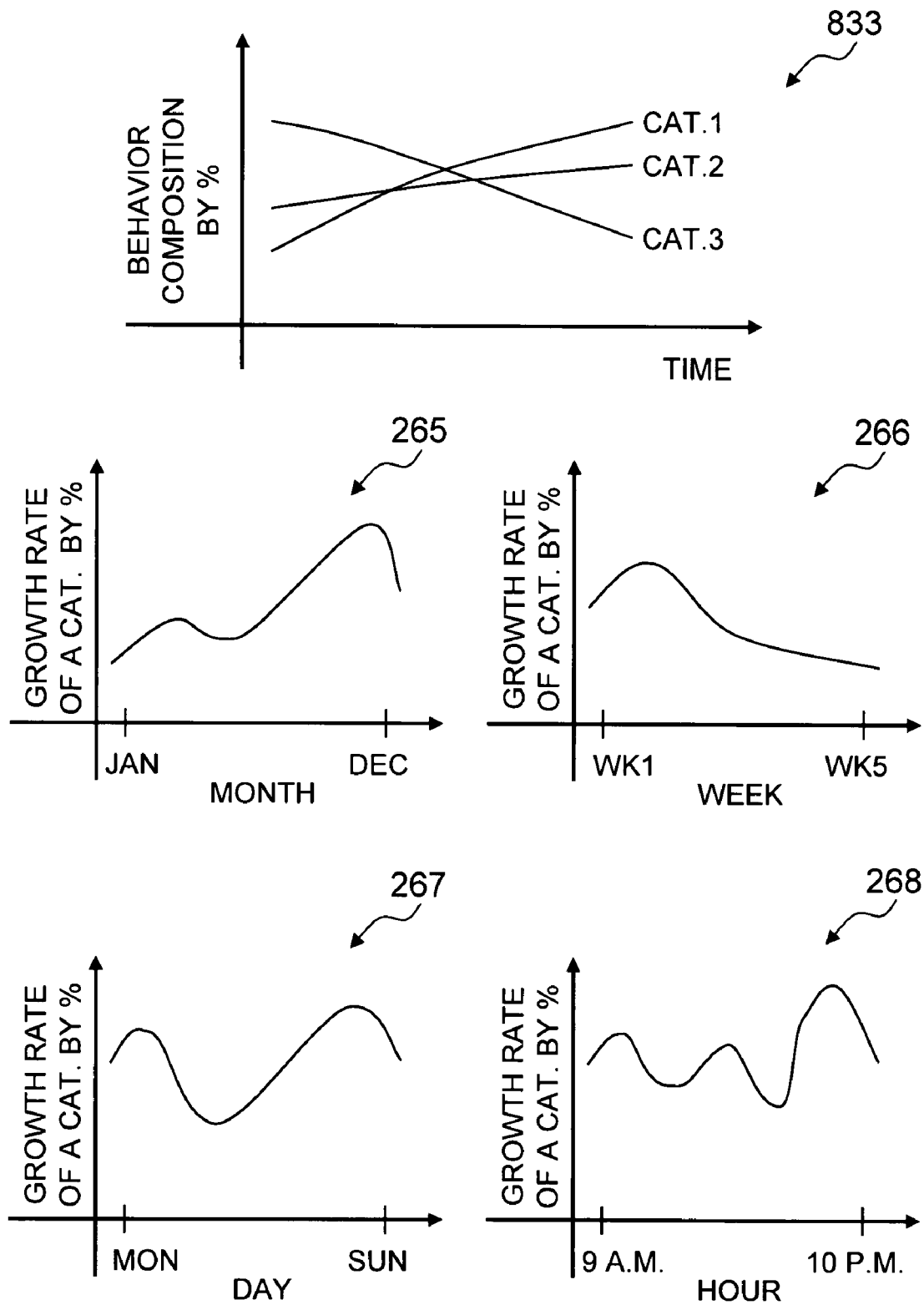

FIG. 31 shows exemplary behavioral composition measurement, month of the year patterns, week of the month patterns, day of the week patterns, and hour of the day patterns in the forecasting process in an exemplary embodiment of the BBP.

Figure 32:
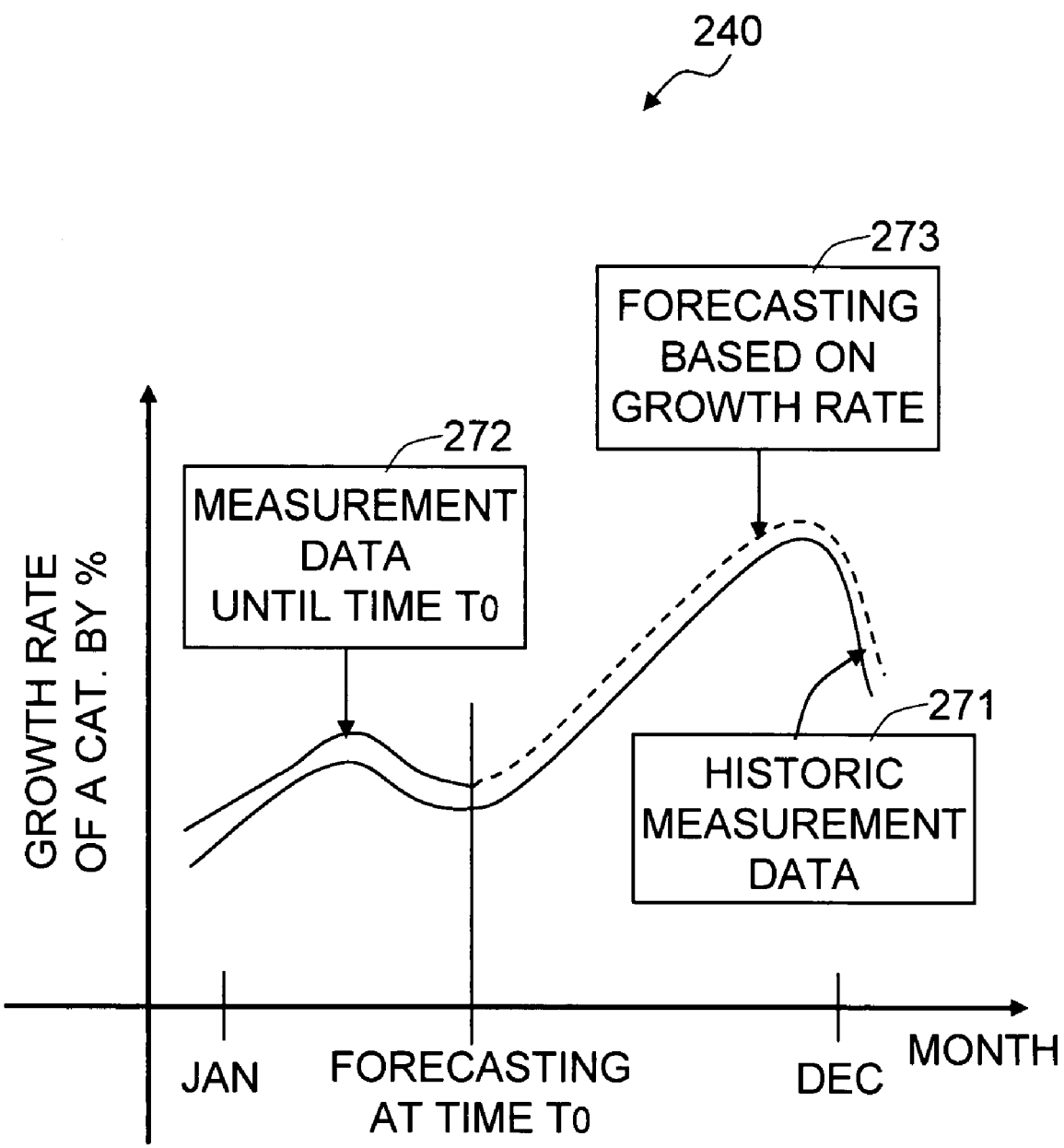

FIG. 32 shows an exemplary forecasting process in the exemplary embodiment of the BBP.

FIG. 33 shows exemplary factors that influence the accuracy of the forecast in an exemplary embodiment of the BBP.

Figure 34:
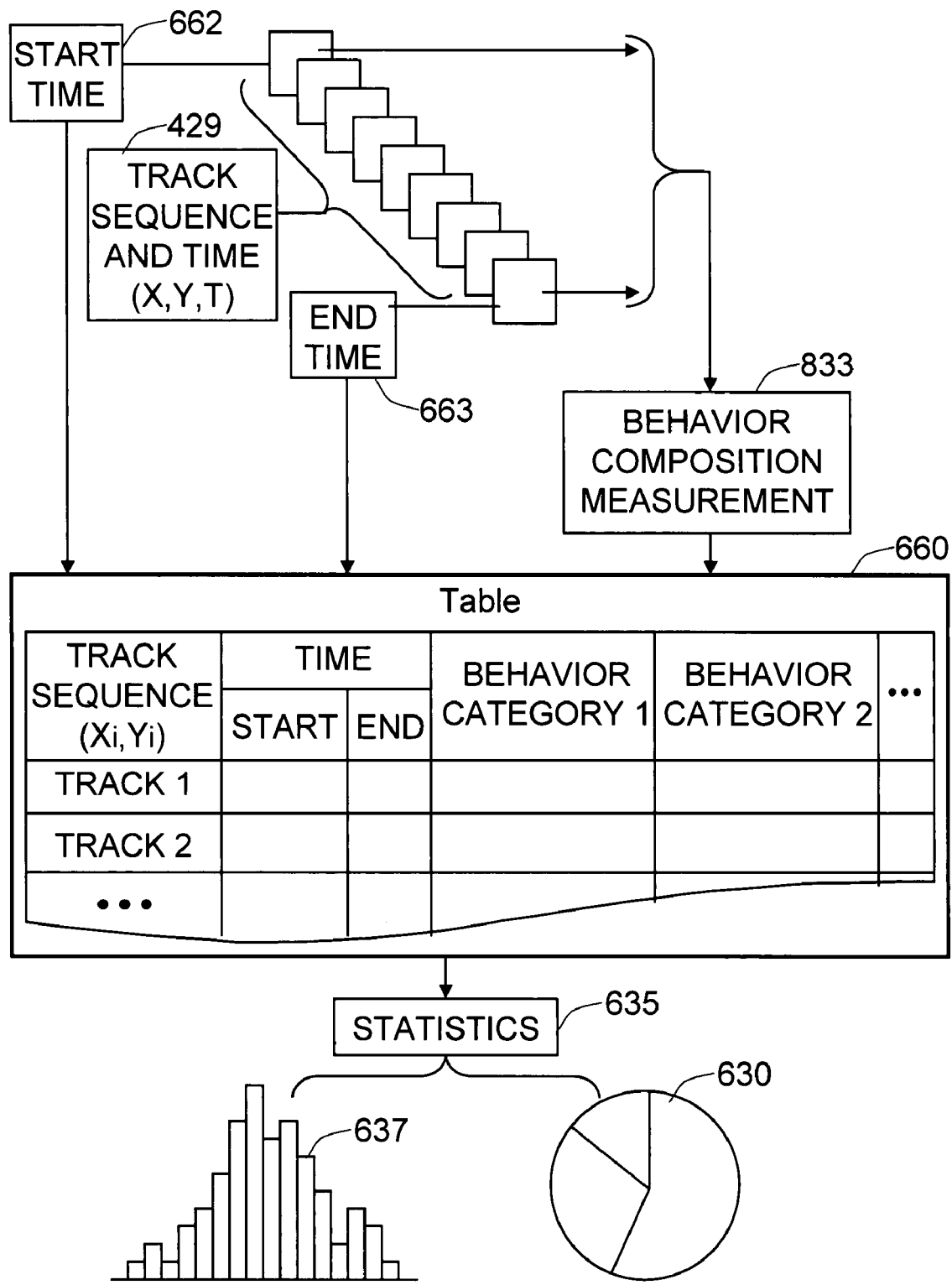

FIG. 34 shows an exemplary data storage process in an exemplary embodiment of the BBP.

Figure 35:
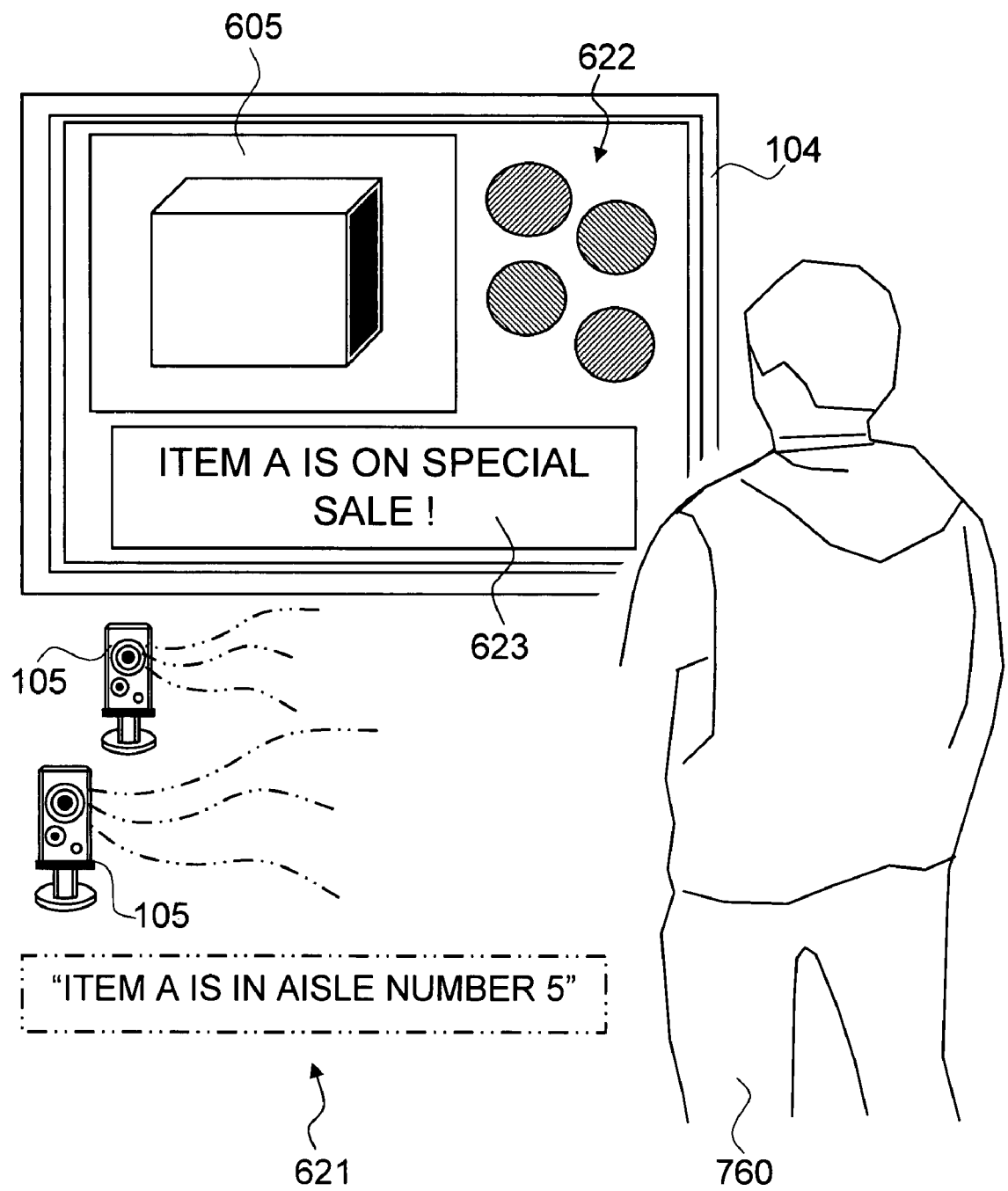

FIG. 35 shows an exemplary marketing media application screen of customized programming content, where the exemplary embodiment of the marketing media application provides customized programming content and further targeted promotional messages to the customer within the customized programming content in order to encourage the customer to engage in certain transactional activity based on the analysis of the behavioral pattern by the BBP.

Figure 36:
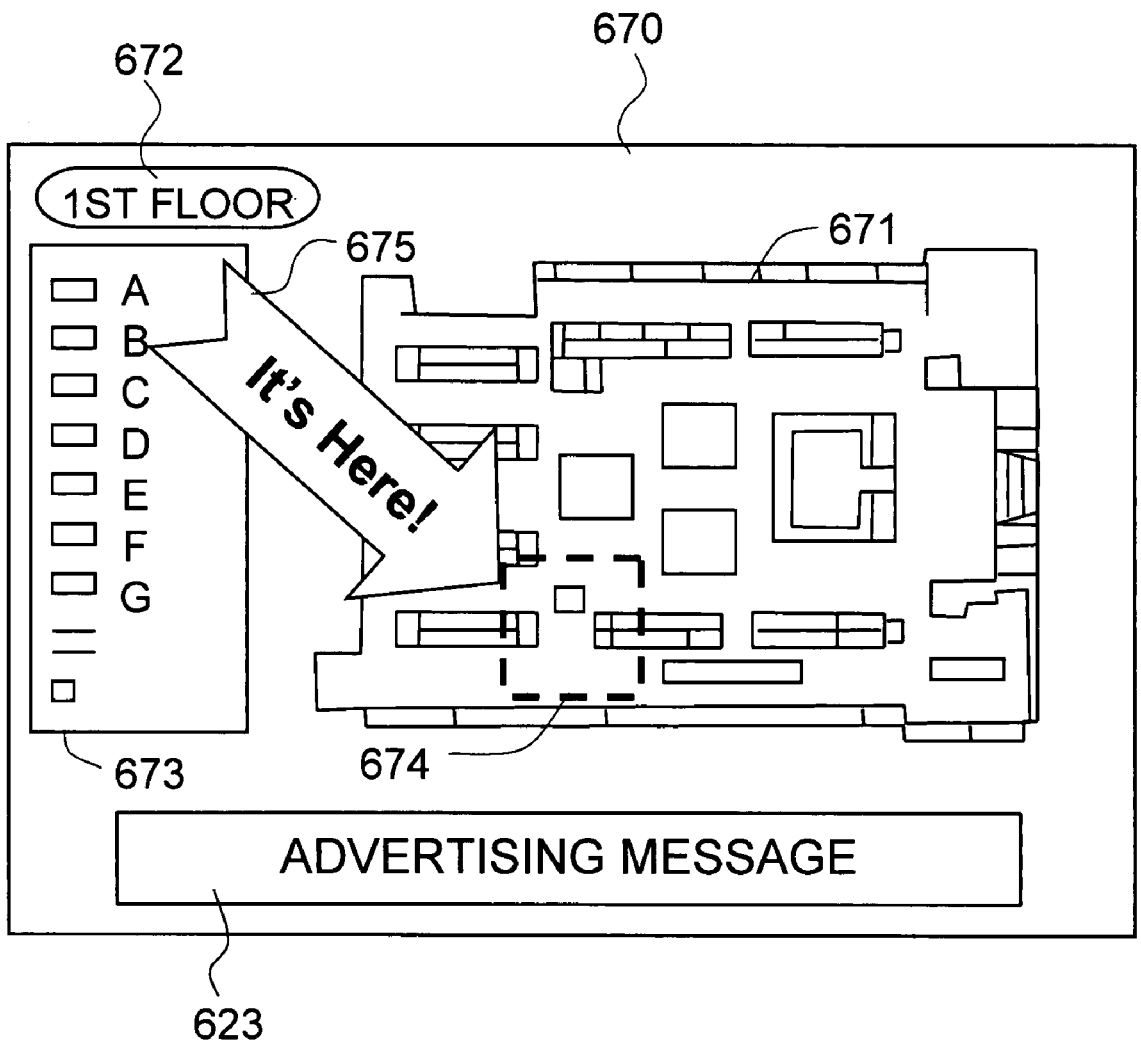

FIG. 36 shows an exemplary map application screen, where the exemplary embodiment of the marketing media application indicates the specific area of the promoted item by displaying an arrow to the specific area where the promoted item is located in order to help the enticed engagement further.

DETAILED DESCRIPTION OF THE INVENTION

Figure 1:
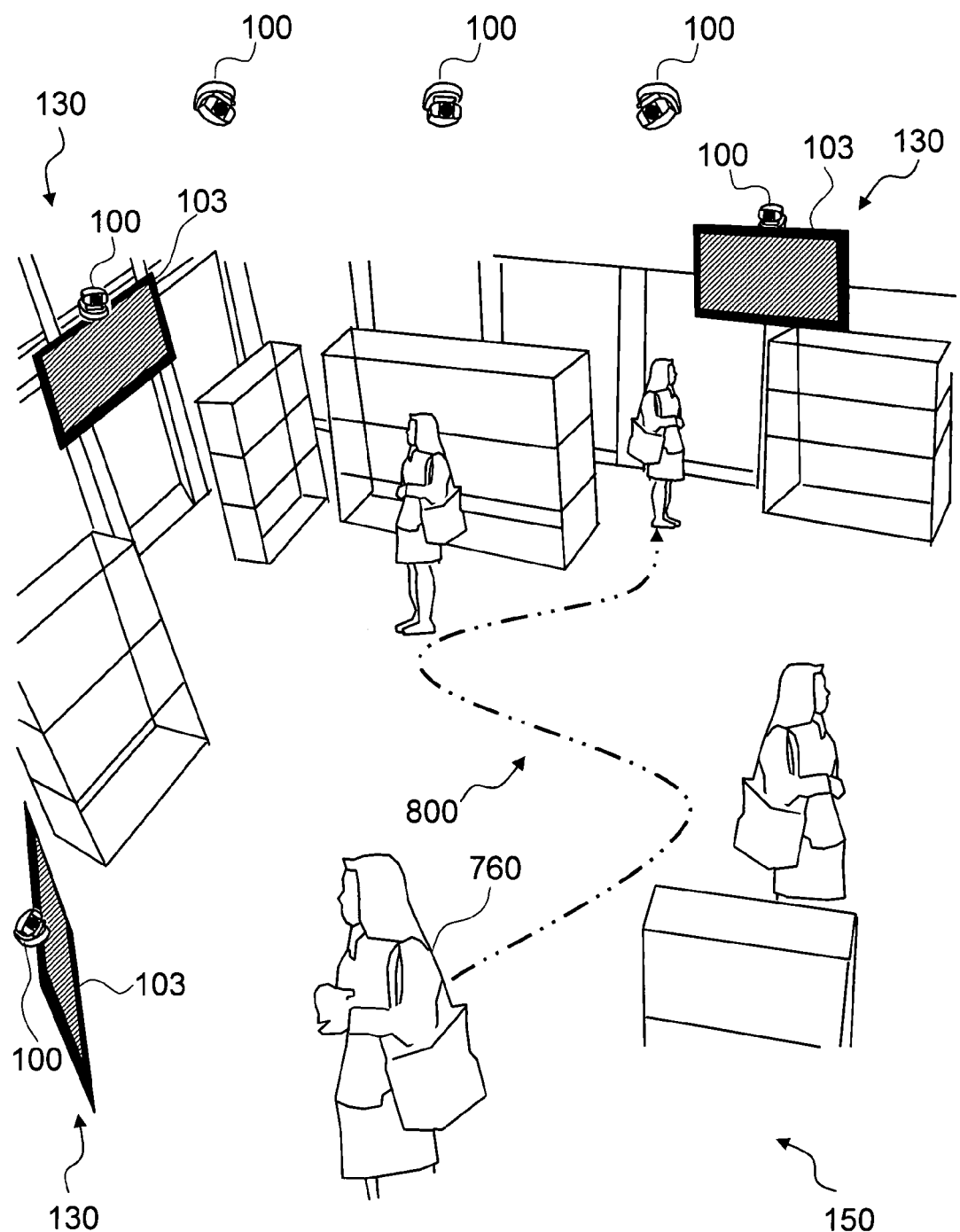

FIG. 1 is an overview of an application of a preferred embodiment of the invention around a node 130, means for playing output 103, in a site 150 of a plurality of sites in a media network 160, where the present invention automatically tracks and analyzes the behavior of a customer 760 through the path 800 the customer 760 took in a site 150. The automatic analysis for each of the customers' behaviors, such as that of the customer 760 in the embodiment, is accumulated and used for characterization 239 and forecasting of the customers' behavioral pattern at the node 130 in the site 150. The present invention provides the forecasting 240 information to a media server 124, which distributes the customized programming contents to each node 130 individually of a plurality of nodes in the site 150, based on the forecasting 240 of the customers' behavioral pattern at the node 130 by the invention. The present invention can also provide the forecasting 240 information to a decision maker in the media network 160, who decides the programming contents. The present invention is called behavior-based programming (BBP).

The present invention is applied to a media network 160, which consists of a plurality of sites, and each site 150 of the plurality of sites serves a plurality of nodes. In the present invention, a site 150 is defined as any physical space where the media network 160 is connected. Therefore, the terms, such as a retail store, a retail place, a public space, or any other equivalent terms, mean an exemplary site 150 of a media network 160 in the description of the invention. The present invention can be applied to a person or a plurality of persons in the site 150. Therefore, the terms, such as a customer, a plurality of customers, or a group of customers, mean an exemplary person or exemplary plurality of persons in a site 150 throughout the description of the invention.

In the exemplary embodiment of the BBP, a node 130 is defined as a "means for playing output" 103. The node 130 can play audio and visual programming content sent by a media server 124 in the place where it is installed. In the exemplary embodiment, a "means for capturing images" 100 can be logically attached to a node 130.

In an exemplary embodiment shown in FIG. 1, the BBP system first captures a plurality of input images of the customer 760 in a store through a plurality of means for capturing images 100. Then, the BBP system processes said plurality of input images in order to analyze the behavior of the customer 760, and the behavior analysis is accumulated. Based on the information from the characterization 239 and forecasting 240, which was calculated with the accumulated behavior analysis and behavioral statistics in the database by the invention, a business application in a media network 160 can customize the programming contents while the customer 760 is nearby a node 130 in the shopping path 800. The means for playing output 103 shows the customized programming contents to the customer 760 when the customer 760 approaches the means for playing output 103.

The BBP processes automatic behavior measurement 237, behavior analysis, characterization 239 of the behavioral statistics, and forecasting 240 for the customers' behavioral pattern in each node 130. Then, the BBP provides the forecasting 240 information to the media server 124 in order to help customize the programming content based on the actual data measurement 237, characterization 239, and forecasting 240 by the invention. Therefore, the programming content for a customer in a node 130 can be customized differently from the programming content for another customer in another node 130, when the forecasting 240 information for the nodes is different from each other.

Overview

The presented invention, BBP, provides tailored audience measurement 237 steps for media networks in public spaces. The steps provide an understanding of audience behavior composition and aid in the matching of content to specific targeted groups. The BBP leverages a proprietary automated behavioral classification as well as its sampling 236, characterization 239 and forecasting 240 methods.

Sample Selection

The exemplary embodiment of the BBP works in concert with network owners and operators to gain a full understanding of each network to be characterized. Then, a decision maker in the exemplary embodiment can select a representative sample of nodes that reflects the breadth and variety of the nodes in the network. This selection process considers variables such as screen classes, geographic markets, site types, screen placements, etc. In another exemplary embodiment, it is possible that the invention measures the behavioral statistics from all the nodes rather than only from sample nodes. Whether the measurement 237 is performed at the sample nodes or entire nodes may be influenced by a plurality of variables, such as the complexity of the targeted measurement data, the goal of the market, and the size of the media network 160.

Measurement

Measurement 237 of the audience for the group of sample screens is carried out using an automated, computer vision based media measurement 237 and behavioral segmentation system. These systems can be installed in the vicinity of each node 130 in the measured nodes, and statistics about each node's addressable audience and that audience's behavioral characteristics are collected. In the BBP, the attachment of these systems to each node 130 is logically defined. Therefore, the BBP allows a certain degree of flexibility in the installation locations between these systems and the node 130.

Network and Screen Characterization

Using statistical methods, the embodiment can provide network-wide and node-level characterizations for each node 130 in the network based on the measurements obtained at the nodes. Characterizations are provided for a given window of time, and detail a node's audience behavioral statistics for that time increment. These characterizations provide the basis for validating current media content, its relevance to the current audience and forecasting 240 of the audience behavior composition for more targeted future purchases and media placements.

Audience Forecasting

Based on the screen-level characterization 239 of the network, derived from actual measurements of audience behavioral statistics over a given period, the invention forecasts the screen and network characterization 239. The forecasting 240 can also be modified based on past characterization 239 data, seasonal and other trends in an embodiment.

Figure 2:
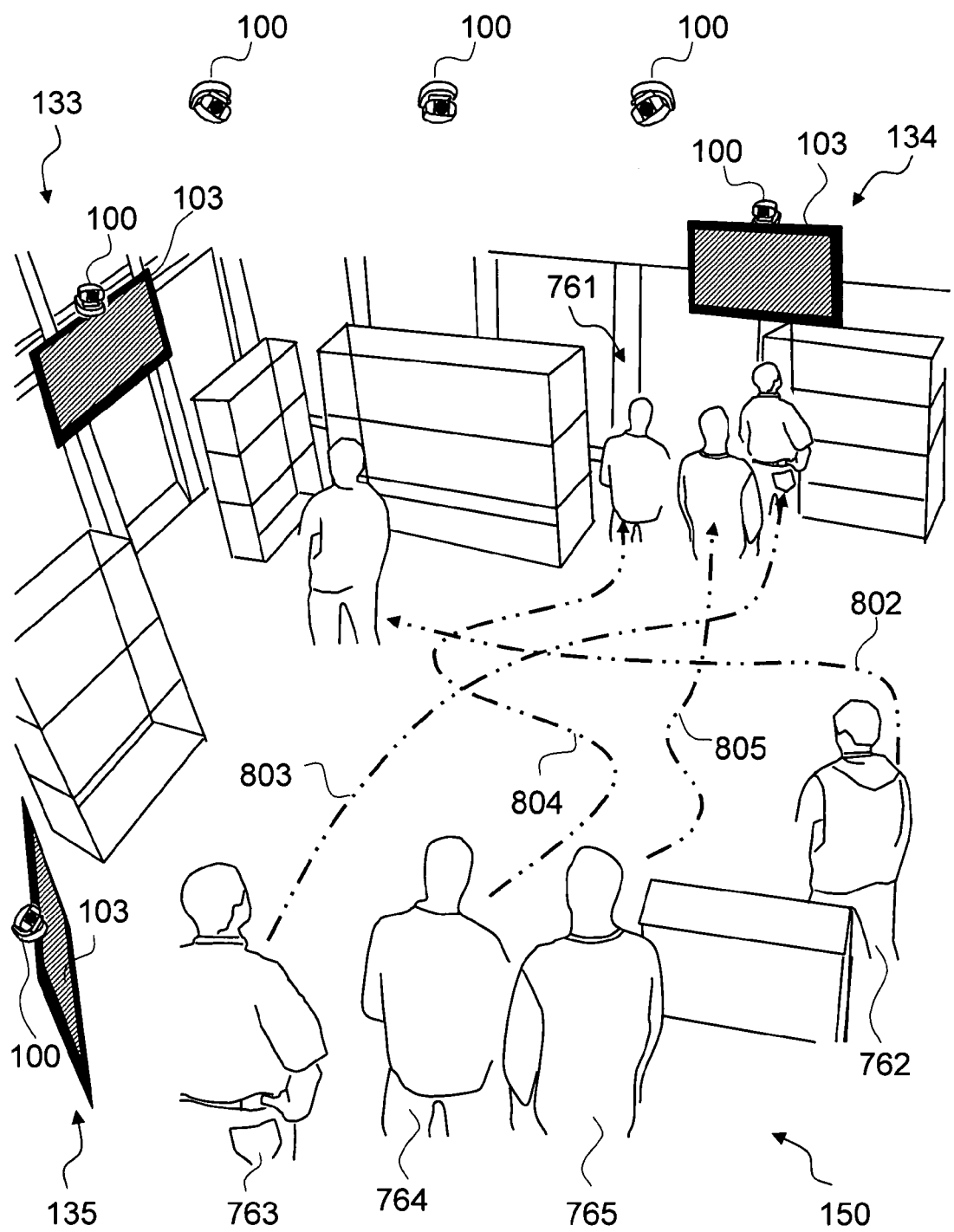

FIG. 2 is an overview of an application of another preferred embodiment of the invention in a site 150 of a plurality of sites in a media network 160, where the present invention tracks and analyzes the behavior of "a group of customers" 761 through the path the group of customers 761 took in a site 150. A media server 124 can distribute the customized programming contents to each node 130 of a plurality of nodes in the site 150 individually, based on the automatic forecasting 240 of the behavioral pattern of the group of customers 761 by the invention.

In the exemplary embodiment of the BBP shown in FIG. 2, the process for analyzing and extracting the behavioral pattern of the customers can be performed either at an individual customer 760 level or at a group of customers 761 level. The group behavior analysis is useful when there is a chance that the group behavior can represent different semantics than a simple collection of behavior analyses of all the individuals in the same group at a particular node 130, such as the "node B" 134 shown in FIG. 2. In the case of the "node M" 135 shown in FIG. 2, a simple collection of behavior analyses of all the individuals in the same group may represent the node appropriately.

In the group behavior analysis, the BBP aggregates the behavioral information measurements from each individual customer and applies a set of predefined rules to the aggregated measurements in order to find optimal forecasting 240 information for the group behavior.

For example, in the exemplary embodiment shown in FIG. 2, the BBP first captures a plurality of input images of the group of customers 761 and their paths, such as the path B 803, path C 804, and path D 805 for the customer B 763, customer C 764, and customer D 765, respectively, based on the individual tracking information in a store through a plurality of means for capturing images 100. Then, the BBP processes said plurality of paths in order to analyze the behavior of each customer and aggregates the plurality of individual behavior analyses.

Within the aggregated behavior analyses for the group of customers 761, each customer's behavior analysis can represent different behavior characterization 239 for the particular "node B" 134. Therefore, the decision for the behavior analysis for the group of customers 761 can be made based on a set of predefined rules for the group behavior. For example, majority among the aggregated behavior analyses can be used as the representative behavioral pattern for the group of customers 761. The BBP determines the final behavior for the group of customers 761 by applying the predefined group behavior rules to the aggregated behavior analyses.

Figure 3:
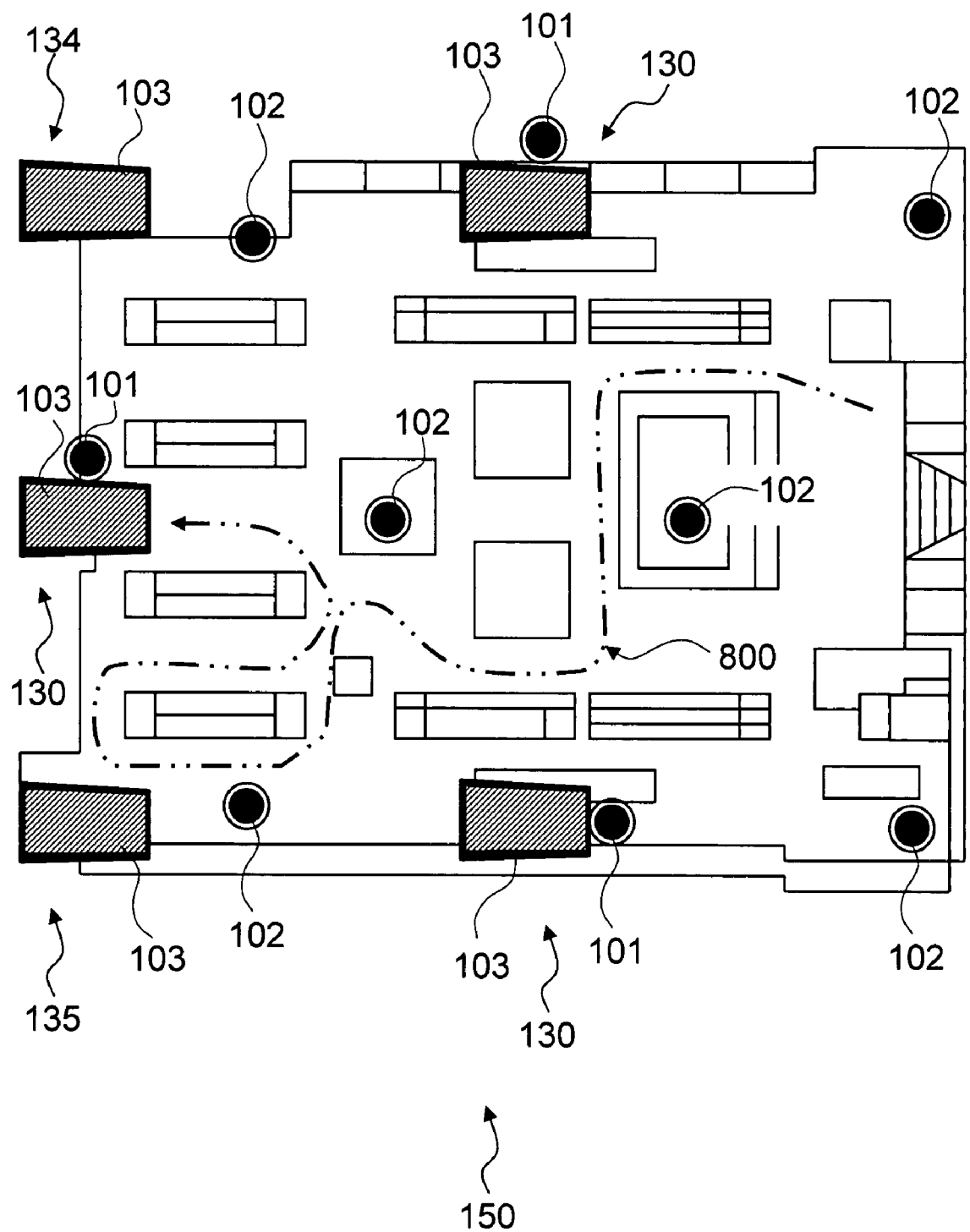

FIG. 3 is a layout view of another embodiment of the invention in a site 150, which shows an exemplary path analysis for a customer 760 in a specific section of a site 150, where the customer 760 in the specific section is tracked through arrays of means for capturing images 100, such as a plurality of "first means for capturing images" 101 and a plurality of "second means for capturing images" 102, in an exemplary embodiment of the present invention.

Figure 4:
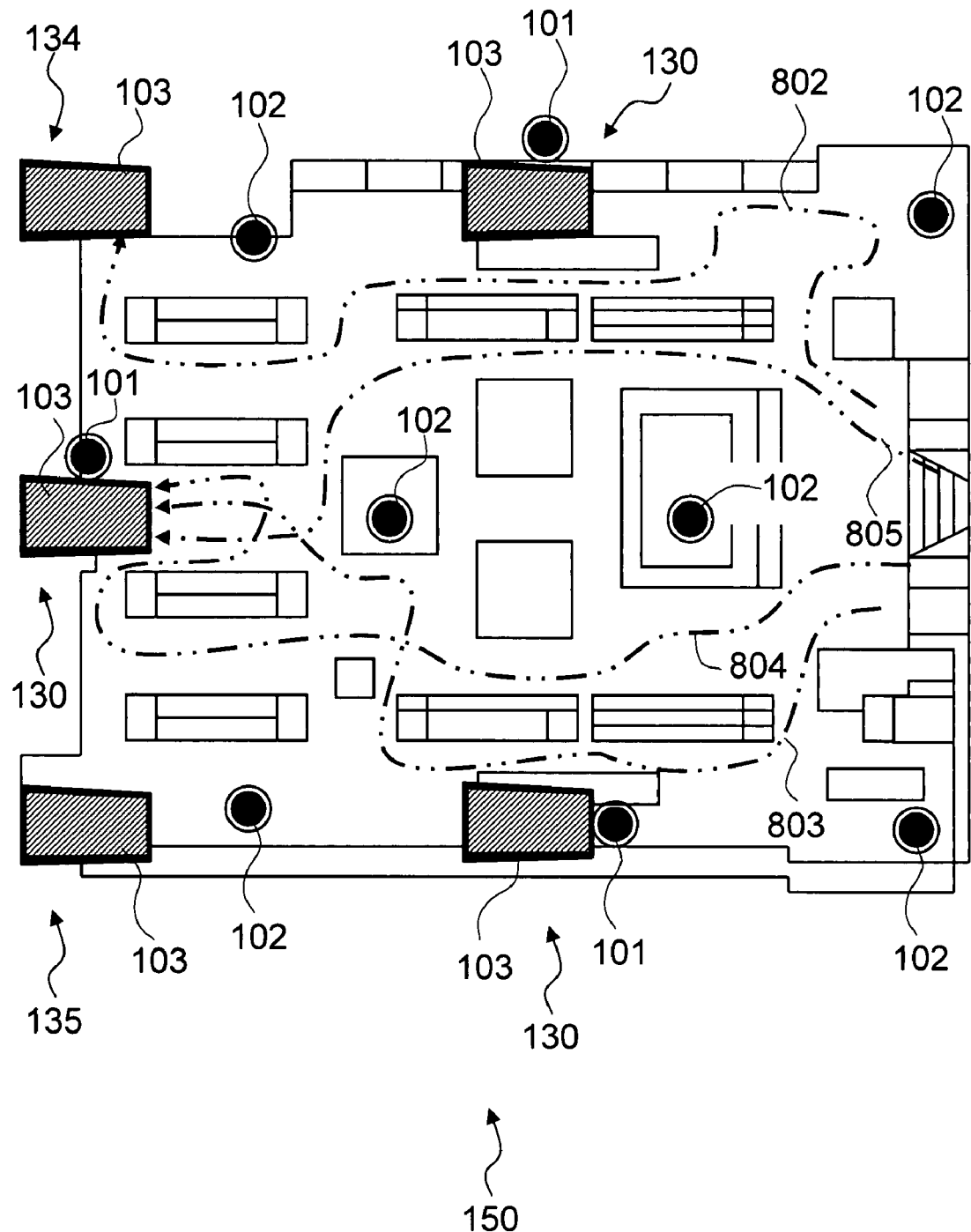

FIG. 4 is a layout view of another embodiment of the invention in a site 150, which shows an exemplary path analysis in a site 150, where a customer 760 and each customer in a group of customers 761 in the store are tracked and the behavior of the customer 760 and the group of customers 761 can be categorized based on multiple behavioral pattern attributes through arrays of means for capturing images 100, such as a plurality of "first means for capturing images" 101 and a plurality of "second means for capturing images" 102, in an exemplary embodiment of the present invention.

As shown in FIG. 3 and FIG. 4, in the exemplary embodiment of the BBP, the means for playing output 103 can be installed separately from the means for capturing images 100 or from the promoted items that appear in the programming contents. This separation of the device locations makes the layout of equipment installation flexible. In exemplary embodiments of the invention, the BBP does not require the means for capturing images 100 for media measurement 237 and behavioral segmentation to be collocated with the node 130 strictly. Therefore, in FIG. 3, the plurality of "second means for capturing images" 102 are not attached to the nearby "node B" 134 nor "node M" 135, while each of the plurality of "first means for capturing images" 101 are attached to each respective node 130. As long as the second means for capturing images 102 can see the customers in the vicinity of the node 130 in its field of view, it can be installed detached from a node 130. This feature gives more flexibility in installing the system in a site 150, so that the owner of a particular site 150 can utilize a pre-existing plurality of first means for capturing images 101 and a plurality of second means for capturing images 102 in the site 150.

In the exemplary embodiment shown in FIG. 4, the BBP can track each of a plurality of customers in a store through arrays of means for capturing images 100. The BBP can also associate the sequence of the paths, 802, 803, 804, and 805, with the shopping interaction of the plurality of customers, whereby the association provides valuable marketing data to the owner of the system.

Figure 5:
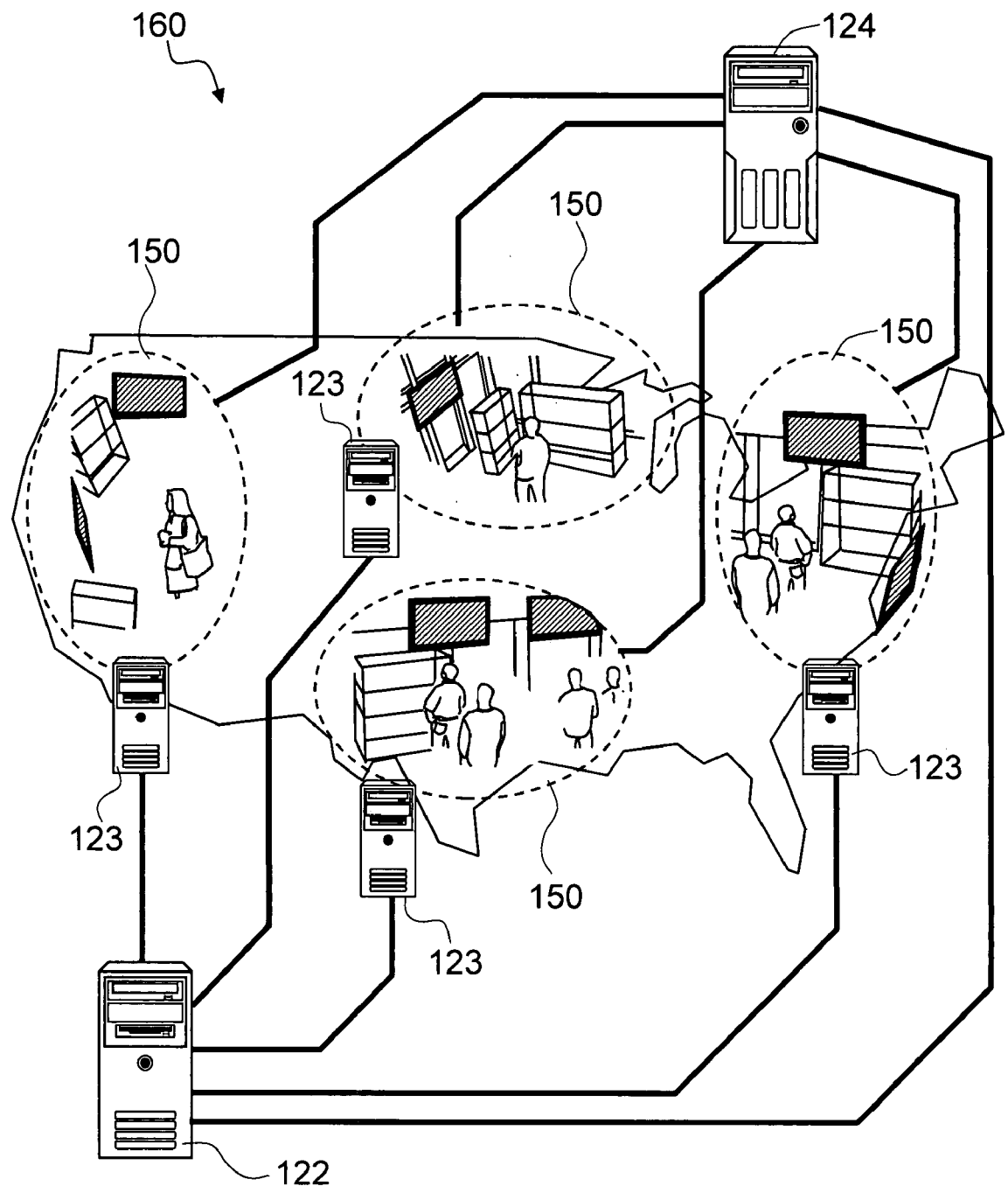
FIG. 5 shows an exemplary media network with a preferred embodiment of the invention, where the media network consists of a plurality of sites, and each site of the plurality of sites serves a plurality of nodes.

FIG. 5 shows an exemplary media network 160 with a preferred embodiment of the invention, where the media network 160 consists of a plurality of sites, and each site 150 of the plurality of sites serves a plurality of nodes. The Vision Processing Unit (VPU) 123 in each site 150 processes the measurement 237 of the customer behavioral statistics for each measured node 130. Then, the measurement 237 data from each Vision Processing Unit (VPU) 123 is sent to the central server 122, which processes extrapolation 238, characterization 239, and forecasting 240 of the customer behavioral statistics for each node 130 in the plurality of nodes in the media network 160. The information for the characterization 239 and forecasting 240 of the customer behavioral statistics is sent to a media server 124, which customizes the programming contents for each node 130 in the plurality of nodes in the media network 160 based on the information.

Figure 6:
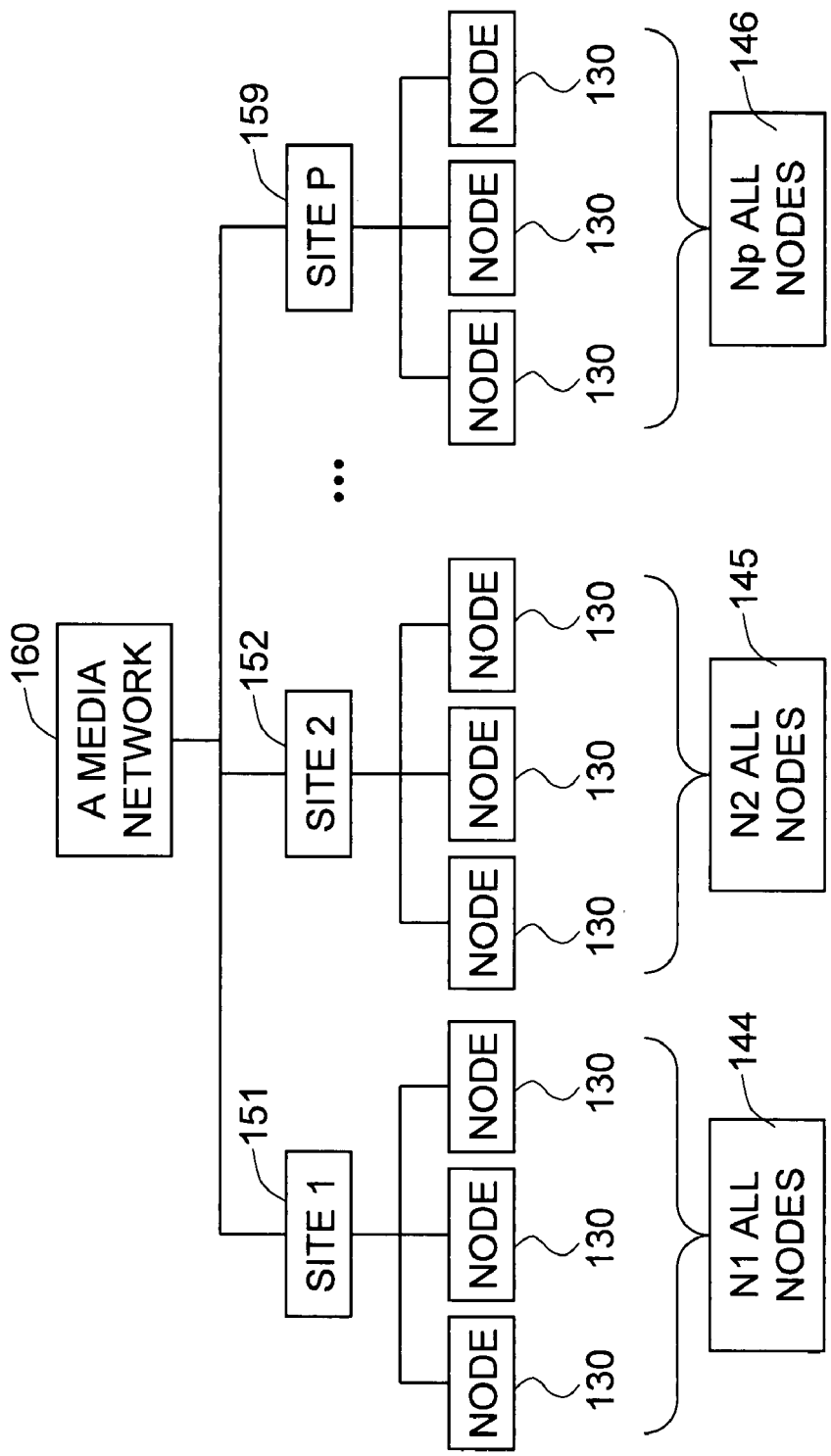
FIG. 6 shows the hierarchy of an exemplary media network with an exemplary embodiment of the invention, where the media network consists of a plurality of sites, and every node of each site of the plurality of sites is used for the behavioral statistics measurement.

FIG. 6 shows the hierarchy of an exemplary media network 160 with an exemplary embodiment of the invention, where the media network 160 consists of a plurality of sites, and every node 130, such as "N1 all nodes" 144 in the "site 1" 151, "N2 all nodes" 145 in the "site 2" 152, and "Np all nodes" 146 in the "site P" 159, in the plurality of sites, is used for the behavioral statistics measurement 237.

Figure 7:
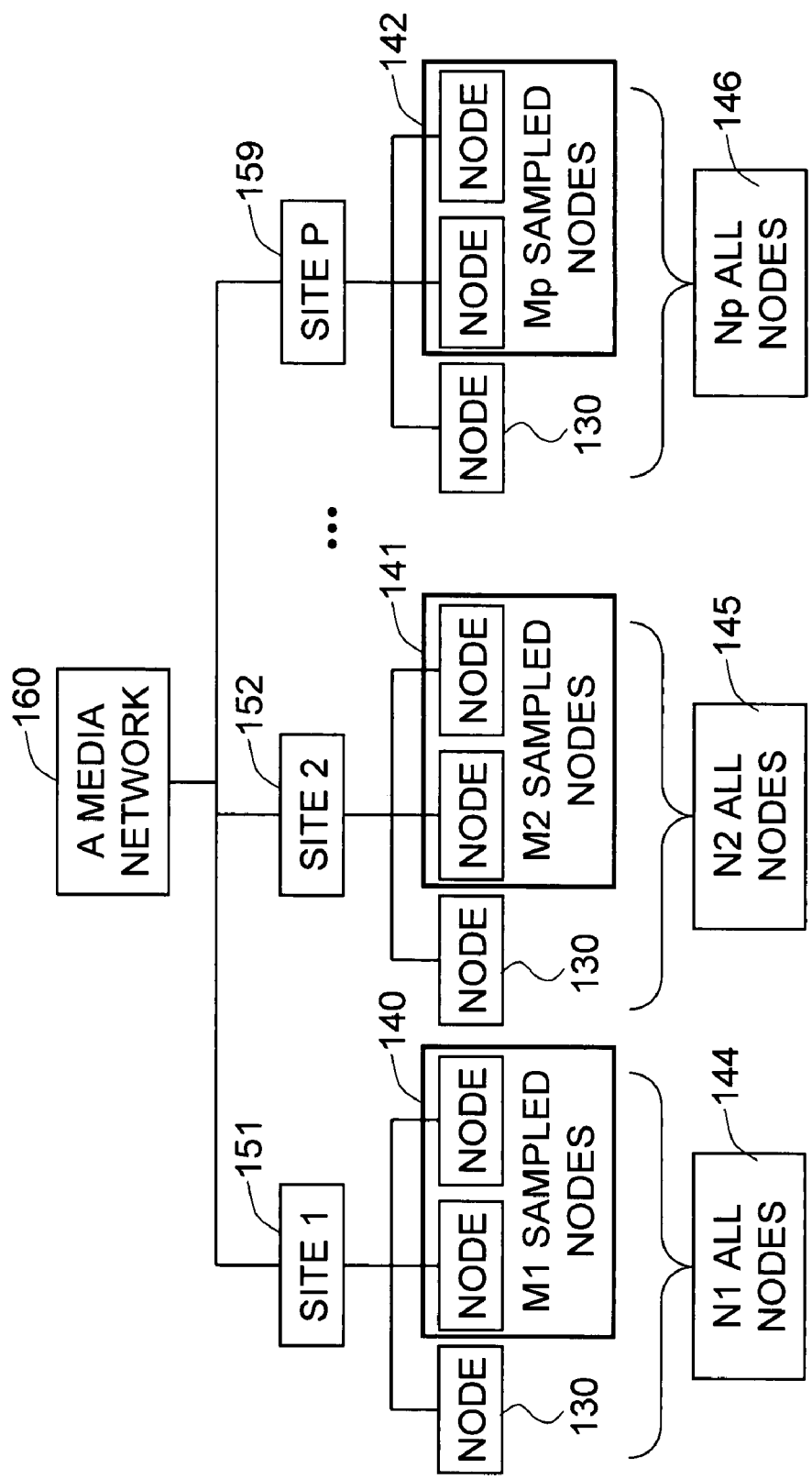
FIG. 7 shows the hierarchy of another exemplary media network with an exemplary embodiment of the invention, where the media network consists of a plurality of sites, and some of the nodes of each site of the plurality of sites are sampled for the behavioral statistics measurement.

FIG. 7 shows the hierarchy of another exemplary media network 160 with an exemplary embodiment of the invention, where the media network 160 consists of a plurality of sites, and some of the nodes of each site 150 in the plurality of sites are sampled as sampled nodes 132 for the behavioral statistics measurement 237. In FIG. 7, "M1 sampled nodes" 140 out of "N1 all nodes" 144 in the "site 1" 151, "M2 sampled nodes" 141 out of "N2 all nodes" 145 in the "site 2" 152, and "Mp 142 sampled nodes" out of "Np all nodes" 146 in the "site P" 159, in the plurality of sites, are sampled for the behavioral statistics measurement 237.

FIG. 8 further shows the hierarchy of another exemplary media network 160 with an exemplary embodiment of the invention, where the media network 160 consists of a plurality of sites, and some of the nodes across the media network 160 are sampled for the behavioral statistics measurement 237. In the exemplary embodiment in FIG. 8, the "M sampled nodes" 139 are selected across the media network 160, while the sampled nodes, 140, 141, and 142, in the exemplary embodiment in FIG. 7 are selected within each site 150.

FIG. 9 shows exemplary steps in an exemplary embodiment of the invention, where the steps consist of the automatic behavioral statistics measurement 237 from all the nodes in each site 150 of a media network 160, the extrapolation 238 of the measurement 237, the characterization 239 of the behavioral information for each node 130, and the forecasting 240 of the behavioral characterization 239 to help customize programming contents for each node 130. In the exemplary embodiment, the automatic behavioral statistics measurement 237 is performed for all the nodes, node A 133, node B 134, node M 135, and node N 136, in the media network 160, and the forecasting 240 of the behavioral characterization 239 is also performed for each of the nodes.

FIG. 10 shows exemplary steps in another exemplary embodiment of the invention, where the steps consist of the automatic behavioral statistics measurement 237 from the sampled nodes rather than all nodes in a media network 160. In the exemplary embodiment in FIG. 10, the sampling 236 of nodes can be performed across the media network 160 or within each site 150 in a plurality of sites in the media network 160. Therefore, the sampled node SB 137 and sampled node SM 138 can be selected across the media network 160 or within each site 150 in a plurality of sites in the media network 160. FIG. 10 also shows the exemplary embodiment further comprises the extrapolation 238 of the measurement 237 from the sampled nodes, the characterization 239 of the behavioral information for each node 130, and the forecasting 240 of the behavioral characterization 239 to help customize programming contents for each node 130.

FIG. 11 shows exemplary steps in another exemplary embodiment of the invention, where the steps consist of the automatic behavioral statistics measurement 237 from the sampled nodes in a media network 160, the extrapolation 238 of the measurement 237, the characterization 239 of the behavioral information for each node 130, the forecasting 240 of the behavioral characterization 239 to help customize programming contents for each node 130, the record keeping of the forecasting 240 information in each node 130, and the utilization of the historical forecasting information record to modify the current forecasting 240 step. In the exemplary embodiment shown in FIG. 11, each node 130 keeps track of the previous forecasting information as, "historical data for node A" 643, "historical data for node SB (sampled)" 644, "historical data for node SM (sampled)" 645, and "historical data for node N" 646, and the historical data is used to modify the next forecasting 240 process. The duration for the past data in the history of characterization 239 is decided by the decision maker of the particular embodiment in the media network 160.

FIG. 12 shows exemplary steps in another exemplary embodiment of the invention, where the steps consist of the automatic behavioral statistics measurement 237 from the sampled nodes in a media network 160, the extrapolation 238 of the measurement 237, the characterization 239 of the behavioral information for each node 130, the forecasting 240 of the behavioral characterization 239 to help customize programming contents for each node 130, the record keeping of the forecasting 240 information in each node 130, the utilization of the historical forecasting information record to modify the current forecasting 240 step, and the utilization of additional Input 243 to modify the current forecasting 240 step. The additional Input 243 that influence the forecasting 240 can be based on past characterization data, such as "historical data for node A" 643, "historical data for node SB (sampled)" 644, "historical data for node SM (sampled)" 645, and "historical data for node N" 646, seasonal and other trends in an embodiment.

FIG. 13 shows an exemplary embodiment of the behavioral statistics measurement 237 and exemplary method for generating useful marketing reports 655 to the decision maker at the decision process 249 in a site 150 or a media network 160 through queries 654.

FIG. 14 shows exemplary pie charts of the exemplary behavioral information measurement 237 from a means for capturing images 100 for a node 130. In FIG. 14, an exemplary "pie chart for behavior classification 1" 631, an exemplary "pie chart for behavior classification 2" 632, and an exemplary "pie chart for behavior classification 3" 633 are shown. The exemplary "pie chart for behavior classification 1" 631, divided the behavior patterns into three different behavior categories. The exemplary "pie chart for behavior classification 2" 632, divided the behavior patterns into "passing by", "level 1 engagement", and "level 2 engagement". The exemplary "pie chart for behavior classification 3" 633, further divided the behavior patterns into "passing by", "noticing", "stopping", "from engaging 1 to engaging P−1", and "purchase". There can be multiple engaging levels between the "engaging 1" and the "engaging P−1". The BBP enables the decision maker in a site 150 or a media network 160 to query the characterization 239 and forecasting 240 information, which is processed based on the actual measurement 237 for the customers' behavioral statistics.

The pie charts in FIG. 14 can provide useful characterization 239 and forecasting 240 information in the report generation 655 step to the decision maker in a site 150 or a media network 160. In the exemplary embodiment, the measurement 237 process can comprise a data aggregation 651 process and data filtering 653 process as shown in FIG. 13.

FIG. 15 shows exemplary statistics of the behavioral information for each node 130 in each site 150 in a plurality of sites in a media network 160. In the exemplary embodiment, as shown in the exemplary "output of characterization for node A" 610 and "output of characterization for node N" 611, the characterizations are provided for a given window of time, such as from Tn−1 to Tn, and the BBP details a node's audience behavioral statistics for that time increment. Each window of time, such as from Tn−1 to Tn, and the entire duration of the measurement 237 period from T1 to Tn can be decided based on various business goals and levels of desired information composition in the media network 160.

FIG. 16 shows an exemplary process of tracking and behavior analysis for a single customer 760 or a group of customers 761 using multiple means for capturing images 100 in a preferred embodiment of the invention.

Person Detection

Person detection in a scene involves temporal segmentation of foreground objects from the scene and then identifying person objects inside the foreground regions, where an intuitive representation of the store itself is considered background and everything else foreground. A plurality of streams of video frames are processed, video input images 1 331, video input images 2 332, and video input images N 333 as shown in FIG. 16, and each pixel within the video frame is analyzed based on its temporal motion information. Each pixel is then modeled as a series of Gaussian distributions with a mean and a standard deviation at the scene background learning 500 process. This approach is shown in the following prior art works: W. E. L. Grimson, et al., "Using Adaptive Tracking to Classify and Monitor Activities in a Site," in IEEE Conference on Computer Vision and Pattern Recognition, 1998; C., Stauffer, et al., "Adaptive background mixture model for real-time tracking," in IEEE Conference on Computer Vision and Pattern Recognition, 1999; and N. Friedman, "S.R. Image Segmentation in Video Sequences: A Probabilistic Approach," in Thirteenth Conf. on Uncertainty in Artificial Intelligence, 1997.

Pixel values falling near one of the Gaussian means are statistically likely to be background pixels, while the remaining pixels will be classified as foreground.

After a background model has been created for each pixel through the scene background learning 500, foreground segmentation 501 can be performed on future frames. Further processing is performed on the foreground segmentation 501 images in order to detect, "person detection 1" 711, "person detection 2" 712, "person detection M" 713, and track, "person tracking 1" 715, "person tracking 2" 716, "person tracking M" 717, people. The possibility for erroneous foreground pixels exists due to changes in lighting or the environment. Thus, not every group of foreground pixels may belong to an actual person. To handle this problem, a template-based approach is used in the exemplary embodiment of the present invention.

FIG. 17 shows an exemplary match process between a blob of foreground pixels with a template representing the size and shape of a person at a given location in a preferred embodiment of the invention.

In "person template matching 1" 921 shown in FIG. 17, the "foreground segmentation blob 1" 923 (solid black line) does not match the person template 925 (dotted line) at this location. There is a low probability that a person exists at this location. However, in "person template matching 2" 922 shown in FIG. 17, the "foreground segmentation blob 2" 924 very closely matches the person template 925 at this location. Therefore, there is a high probability that a person exists at this location.

Likewise, each "blob" of foreground pixels is matched to a template representing the size and shape of a person at a given location, as illustrated in the exemplary process shown in FIG. 17. By comparing the person templates to areas with segmentation in the image, the probability that a person is standing at a specific location can now be computed. Threshold is then used to filter out low-probability person-matches.

FIG. 18 shows an exemplary process of correcting the tracks to account for camera and lens-specific distortion in a preferred embodiment of the invention.

Person Tracking within a Camera View

In the exemplary embodiment, person tracking 714 within a camera view can be performed by the Continuously Adaptive Mean Shift (Camshift) algorithm. Tracks are created in regions where people were previously detected. The color histogram surrounding the track's location is computed, and then used to generate a probability distribution. The peak (mode) of this distribution is then located from frame to frame by an adapted version of the Mean Shift algorithm. The Mean Shift algorithm can be found in the prior art by G. R. Bradski, "Computer video face tracking for use in a perceptual user interface," Intel Technology Journal, Q2, 1998.

Given a probability density image, the exemplary embodiment can find the mean of the distribution by iterating in the direction of maximum increase in probability density. At each frame, the position is recorded and combined with past location information to generate a valid track.

Multi-Camera Tracking

There are 3 key components to the multi-camera tracking system that the exemplary embodiment is concerned with, which are as follows:

1) correct camera-specific distortion,
2) geometric projection of the tracks from local camera coordinates to a world coordinate system, and
3) finding track correspondences between multiple camera views and joining them.

Prior to projecting the tracks onto the floor plan 342, the tracks themselves must be corrected to account for camera/lens-specific distortion. Generally, the image that is being processed suffers from either fish-eye or barrel distortion due to the bending of light as it passes through a camera lens, as illustrated by the person tracking 714 in the camera view (with distorted tracking) 340. This distortion is modeled by a polynomial, using its degree and coefficients as input parameters specific to each camera/lens combination. The polynomial itself defines the transformation of a point x from the distorted coordinate space to a point P(x) that represents how the point would appear if there were no camera distortion. Each track is then undistorted to allow for more accurate geometric projection, as illustrated by the person tracking 714 in the camera view (with undistorted tracking) 341.

Projecting the local camera tracks, a plurality of the person tracking 714 in the camera view (with undistorted tracking) 341 onto the floor plan 342 is performed by deriving a homography matrix based on point correspondences. A series of point correspondences are marked between the local camera view and the world coordinate view, which in this case is the store's floor plan 342. The relationship between the corresponding sets of points in the two images is used to define a homography matrix. This homography matrix can be used to transform points (and ultimately person tracks) from one coordinate system to another.

Correspondences between tracks across a plurality of means for capturing images 100 are found by using the method discussed by F. Porikli, "Multi-Camera Surveillance: Object-Based Summarization Approach," March 2004, MERL. In the exemplary embodiment, Bayesian Belief Networks can be used to establish the correspondences. This method is based on the strong correlation between camera system geometry and the likelihood of the objects appearing in a certain camera view after they exit from another one.

FIG. 19 shows an exemplary "network of a plurality of means for capturing images" 851 and correspondences between tracks across the plurality of means for capturing images 100 in a preferred embodiment of the invention. FIG. 19 also shows the Bayesian Belief Network for the "network of a plurality of means for capturing images" 851. Each means for capturing images 100 corresponds to a node 130 in the directed graph 852. The links show the possible physical routes between the plurality of means for capturing images 100.

As illustrated in FIG. 19, the "network of a plurality of means for capturing images" 851 can be modeled as a Bayesian Belief Network, which is a graphical representation of a join probability distribution over a set of random variables. The Bayesian Belief Network is a directed graph in which each set of random variables is represented by a node 130, and directed edges between nodes represent conditional dependencies. The dependencies can represent the casual inferences among variables. The transition probabilities, corresponding to the likelihood of a person moving from one camera to another linked camera, are learned by observing the system. Note that each direction on a link may have a different probability. However, the total incoming and outgoing probability values are equal to one. This results in a transition probability "matrix for a plurality of means for capturing images" 853. This method will provide a scalable tracking system with a plurality of means for capturing images 100, such as a multi-camera tracking system, which handles the uncertainty in associating people across a plurality of means for capturing images 100.

FIG. 20 shows exemplary spatio-temporal primitives for modeling human-object behavior in retail enterprises, where a preferred embodiment of the invention is often installed.

Behavior Recognition

In an exemplary embodiment the behavior recognition can be achieved via spatio-temporal analysis of tracks using geometry and pattern recognition techniques. This is achieved by defining and detecting spatio-temporal relations specific to the retail enterprise domain followed by a Bayesian Belief propagation approach to modeling primitive behaviors specific to the retail domain.

In the exemplary embodiment shown in FIG. 20, the primitive behaviors can comprise categories of "customer moves towards object" 861, "customer doesn't walk towards object" 862, "customer velocity reduces" 863, "customer velocity increases" 864, "customer stands in front of object" 865, and "customer walks away from object" 866. These primitive behaviors can then be combined to model predefined complex behaviors. This method is similar to two stage behavior recognition systems where probabilistic inference is performed on high-level semantic notions, using variable length Hidden Markov Models (HMM), Bayes nets and stochastic grammar. Exemplary prior arts for the variable length Hidden Markov Models (HMM) can be found in A. Galata, et al., "Modeling Interaction Using Learnt Qualitative Spatio-Temporal Relations and Variable Length Markov Models," in European Conference on Artificial Intelligence, 2002, Lyon. Exemplary prior arts for the Bayes nets can be found in H. Buxton, et al., "Advanced visual surveillance using bayesian networks," in International Conference on Computer Vision, 1995, Cambridge, Mass., and S. G. Gong, et al., "Bayesian nets for mapping contextual knowledge to computational constraints," in British Machine Vision Conference, 1993, Guildford, England. Exemplary prior arts for the stochastic grammar can be found in Y. Ivanov, et al., "Recognition of Visual Activities and Interactions by Stochastic Parsing," IEEE Trans on Pattern Analysis and Machine Intelligence, 2000. 22(8): p. 852-872, and D. Moore, et al., "Recognizing Multitasked Activities using Stochastic Context-Free Grammar," in Workshop on Models versus Exemplars in Computer Vision held in Conjunction with IEEE CVPR 2001, 2001, Kauai, Hi.

This approach to detecting qualitative spatio-temporal relations for human-object relationships is based on methods developed by 1) A. Cohn, et al., "Towards an Architecture for Cognitive Vision Using Qualitative Spatio-Temporal Representations and Abduction," Spatial Cognition III, 2003; 2) J. Fernyhough, et al., "Event recognition using qualitative reasoning on automatically generated spatio-temporal models from visual input," in IJCAI 97 Workshop on Spatial and Temporal Reasoning, 1997, Nagoya; and 3) J. Fernyhough, et al., "Constructing Qualitative Event Models Automatically from Video Input, Image and Vision Computing," 2000(18): p. 81-103.

Fernyhough, et al. predefined the spatial relationships in terms of a set of proximity relationships and relative direction of motion relationships. FIG. 20 shows the exemplary spatio-temporal primitives, which an exemplary embodiment of BBP can use for modeling the relationships between human and object in retail enterprises. These spatio-temporal relations scene descriptors are invariant to the absolute position and direction of the interacting objects within a scene and encode relative spatio-temporal information. Motion history information from the tracking algorithm will be used to extract features and create a feature vector, which contains the relative spatial location and relative velocities with respect to the objects in the scene. These feature vectors will then be used to develop probabilistic models for recognizing the spatio-temporal relationships in a new video sequence. These spatio-temporal relations will then be combined using probabilistic networks to model the desired behavior.

Once models for desired customer behavior exist, customer behavior may then be analyzed. As a customer 760 approaches a means for playing output, the customer's previous behaviors will be analyzed and this information will be used to influence the media content selection. For example, a customer 760 that recently spent large amounts of time in the cosmetics section may be shown a programming content for cosmetics containing references to items on specific shelves where they had shopped.

In group situations, the behaviors of the individuals will be analyzed to determine whether those individuals have been traveling as a group within the store or are simply independent individuals arriving on the scene simultaneously. If the determination has been made that the individuals are traveling as a group, then their individual behaviors may be combined into a set of group-specific behaviors (group moves towards object, group velocity increases, etc. . . . ). A decision may then be made to tailor media content to a group, rather than decide among separate individuals.

Exemplary attributes for analyzing behavioral pattern based on visual information can be achieved from the shopping and walkthrough history of the customer 760 or the group of customers 761, i.e. spatial information where the customer 760 or the group of customers 761 has been in the path 800 through the store, using arrays of sensing devices, such as the means for capturing images 100.

In the present invention, another exemplary attribute of extracting the interest of the customer 760 or the group of customers 761 can be processed by measuring the time spent in a certain area within the store.

In the present invention, the step and means for analyzing the path 800 of the customer 760 or the group of customers 761 can further comprise the following attributes:
 a) temporal pattern,
 b) spatial preference pattern,
 c) frequency pattern,
 d) relational pattern, and
 e) special event pattern.

The exemplary temporal pattern attribute can be time spent in each section of the store or the time of the day. The exemplary spatial preference pattern attribute can be path history or preference in a certain path vs. others. The exemplary frequency pattern attribute can be frequency of visiting certain sections multiple times or more times than other sections. The exemplary relational pattern attribute can be relative effect of one path vs. another, relative effect of a path 800 when there is interior decoration modification or stock-layout change, or relationship between the path 800 and amenities in the store, such as a bathroom, diaper changing room, water fountain, telephone booth, and customer service. The exemplary special event pattern attribute can be change in the path 800 due to the special event of the day.

In the exemplary embodiment, as also shown in the earlier FIGS. 3 and 4, the BBP can categorize the behavior of the customer 760 or the group of customers 761 based on the exemplary spatial preference pattern attribute based on the history of each path 800. As such, when this categorization is useful according to the market needs of the owner of a particular system, as shown in FIG. 4, different paths are analyzed and categorized in order to show the spatial preference pattern by the customers.

FIG. 21 shows exemplary shopping interaction levels in a target physical space that are observed to produce the behavioral analysis. The shopping interaction levels can be defined by a decision maker in a media network 160 based on the spatio-temporal relations. For example, the "table for shopping interaction levels" 938 divides the customer shopping interaction into "passing by", "noticing", "stopping", from "engaging 1" to "engaging P-1", and "purchase". They are labeled as "level 1" interaction, "level 2" interaction, "level 3" interaction, from "level 4" interaction to "level P-1" interaction, and "level p" interaction, respectively. Notice the engaging interaction can be further divided into multiple engaging levels depending on the level of engaging defined by a particular media network 160.

FIG. 22 shows exemplary layout of a plurality of categories in a site 150 for an exemplary behavior analysis and an exemplary table for category sequence measurement among the plurality of categories. In the BBP, the "category" is a logically defined entity, such as a group of products, a group of product types, space, an area in a store, a group of areas in a store, a display of a group of products, or a department with similar items. Thus, a category is not necessarily a spatial single entity, which means a category can consist of multiple distributed physical spaces.

Based on the "layout of categories" 951, the BBP can correlate various customer behaviors and shopping interaction levels to the predefined categories. A list of some such exemplary correlations for the behavior analysis are as follows:
 1) Maps: Display of qualitative visualization for store designer for overall shopping behavior,
 2) Quantitative Measurement per Category, such as a ratio between shopping interaction levels, level 2 over level 1,
 3) Dominant Path Measurement, which implies specific decision pattern because a finite number of next regions to choose from a "location A" defines the number of direction from that specific location and shows the tendency/preference of customers' decision for the next path,
 4) Category Correlation of shopping paths for optimal distance between categories, and
 5) Category Sequence, which includes the order of engagement.

The table for category sequence 955 is an exemplary embodiment of a table, which measures sequence relationship among a plurality of categories. For example, the first row of the table shows that there were 394 customers who visited category 2, 514 customers who visited category 3, and 130 customers who visited category 4 after visiting category 1. The 2-dimensional arrays of values in the table for category sequence 955 in FIG. 22 show the measured counts for the adjacent categories that the customers immediately visited right after visiting a category in the leftmost column of the table. However, the length of the category sequences can be extended further. In another exemplary embodiment of the table for category sequence, the table can measure three sequences of categories the customers visited one by one, using 3-dimensional arrays of values.

FIG. 23 shows an exemplary behavior measurement 237 among a plurality of nodes in a site 150 during a window of time through a plurality of exemplary tables for behavior measurement. Each row in the exemplary tables shows a string of behavior measurement 237 for a customer during a window of time. In the exemplary tables in FIG. 23, the "Table for Behavior Measurement 1" 836 is an exemplary behavior measurement 237 for the node 1 and the "Table for Behavior Measurement 2" 837 is an exemplary behavior measurement 237 for the node N among the plurality of nodes, from node 1 to node N, during the same window of time W1 (T1~Tn). In the exemplary table, each element in the string of behavior measurement 237 for a customer during a window of time can be a 3-tuple, consisting of category number, interaction level, and information with regard to the means for playing output. For example, the string of behavior measurement 237 for the customer 1 in the "Table for Behavior Measurement 1" 836 consists of (C1,PB,BD), (C2,PB,BD), (C3,L2,BD), . . . , (C4,PB,BD), where C1, C2, C3, and C4 mean category numbers, PB means passing-by interaction, L2 means level 2 interaction, and BD means before the customer approaches the means for playing output. In another exemplary row, the string of behavior measurement 237 for the customer 2 in the "Table for Behavior Measurement 1" 836 consists of (C1,PB,BD), (C3,L2,D), (C2,PB,AD), . . . , (C4,PB,BD), (C5,L3,D), where C1, C2, C3, C4, and C5 mean category numbers, PB means passing-by interaction, L2 means level 2 interaction, L3 means level 3 interaction, D means the customer 2 approached the means for playing output at the node 130, BD means before the customer approached the means for playing output, and AD means after the customer approached the means for playing output. Therefore, the second 3-tuple element, (C3,L2,D), in the string means that the customer 2 was in the category 3, and the customer's behavior was measured as level 2 interaction, while the customer 760 approached the means for playing output at the node 1 after the customer 760 visited the category 1 previously within the window of time W1.

In the exemplary tables in FIG. 23, the number of customers per table can be various, and a customer 760 in one table does not necessarily mean the same customer as another in another table just because both of them are designated by the same ID. In addition, the starting time, ending time, and length of the string of behavior measurement 237 for each of the multiple customers during a window of time can be various because the customers appear and disappear in the field of view of the means for capturing images at a node 130 in different patterns.

Based on the plurality of exemplary tables for behavior measurement and accumulated statistics for the customer behavioral patterns, various behavior analyses are possible. For example, the BBP can provide maps, which display qualitative visualization for overall shopping behavior and paths. In the exemplary embodiment of the maps, the BBP can use color-coded symbolic expressions to differentiate the behavior characterization 239 and forecasting 240 among a plurality of behavior characterizations and forecasting 240 at the site 150. The BBP can also provide quantitative measurement per category based on the accumulated statistics per categories, such as a ratio between shopping interaction levels, level 3 over level 2. For example, if the counts for (C5,L2,D) are approximately 4 times larger than that of (C5,L3,D), we can learn that about 25% of the customers at category 5 moved from level 2 interaction to level 3 interaction.

In another exemplary behavior analysis, the BBP can calculate the percentage of visits per each category compared to all the visits to categories after the customer 760 approached the means for playing output, such as 10% for category 1, 11% for category 2, and so on, after the customer 760 approached the means for playing output at the node 1 during the window of time W1. In this example, the order of visits is not taken into consideration.

However, in another exemplary behavior analysis, the BBP can also calculate the percentage of visits for the categories that the customer 760 visited first, right after the customer 760 approached the means for playing output, such as 30% of the customers first visited the category 1 right after approaching the means for playing output, 20% of the customers first visited the category 2 right after approaching the means for playing output, and so on. Likewise, the BBP can also calculate the last category visit statistics right before the customers approach the means for playing output.

In addition to these analyses for the sequence and ordering of the categories, in another exemplary behavior analysis, the BBP can also calculate the correlation among the categories. For example, the BBP can count the number of n-tuple categories the customer 760 visited before or after approaching the means for playing output, such as the number of visits for the 2-tuple categories, [(C1,PB,BD), (C2,PB,BD),], [(C1,PB,BD), (C3,PB,BD),], [(C1,PB,BD), (C4,PB,BD),], [(C2,PB,BD), (C3,PB,BD),], [(C2,PB,BD), (C4,PB,BD),], and [(C3,PB,BD), (C4,PB,BD),]. In this measurement, the value of n in the n-tuple and the total number of categories, denoted as Ntc, can be decided by the decision maker in a particular media network 160. For example, the total number of categories, Ntc, can be decided based on the available number of adjacent categories from a node 130, which is a means for playing output. Then the number of ways of grouping the un-ordered n-tuples among the total number of categories, Ntc, becomes a simple process for calculating binomial coefficient, which is "Ntc C n: Ntc choose n".

In another exemplary behavior analysis, the BBP can also calculate the dominant direction, which the customer 760 took after visiting a certain category, based on the statistics. For example, if the percentage of [(C1,PB,BD), (C2,PB,BD),] is 60%, [(C1,PB,BD), (C3,PB,BD),] is 30%, and [(C1,PB,BD), (C4,PB,BD),] is 10%, we can learn a behavioral tendency in which more customers prefer the path toward category 2 rather than paths toward category 3 or 4, after visiting the category 1.

FIG. 24 shows an exemplary behavior measurement 237 for an exemplary node 130 for a plurality of different windows of time through a plurality of exemplary tables for behavior measurement 237. In the exemplary tables in FIG. 24, the "Table for Behavior Measurement 1" 836 and the "Table for Behavior Measurement 3" 838 are exemplary behavior measurements for the same node 1 but during different windows of time, from W1 (T1~Tn) to Wp (T1~Tn). In the exemplary tables in FIG. 24, the number of customers per table can be various, and a customer 760 in one table does not necessarily mean the same customer as another in another table just because both of them are designated by the same ID. Therefore, the customer 1 in the "Table for Behavior Measurement 1" 836 and the customer 1 in the "Table for Behavior Measurement 3" 838 are not necessarily the same customer. As explained above for FIG. 23, in the exemplary tables, each element in the string of behavior measurement 237 for a customer 760 during a window of time can be a 3-tuple, consisting of category number, interaction level, and information with regard to the means for playing output.

FIG. 25 shows an exemplary process of single customer tracking and behavior analysis in a preferred embodiment of the invention using a plurality of means for capturing images 100. In the exemplary embodiment, the BBP detects 770 and tracks 771 the customer 760 in the video input images, from "video input images 1" 331 to "video input images N" 333, from a plurality of means for capturing images 100. The BBP joins the trajectories of the customer tracks from a video of a means for capturing images 100 to another video of a means for capturing images 100 while the customer 760 appears and disappears between the fields of view among a plurality of means for capturing images 100. Based on the tracking information, the BBP analyzes 810 the path 800 of the particular customer 760 and the path analysis 810 can be used as one of the ways to process the behavior analysis 830 of the customer 760 and obtain useful information about the customer behavior. Then, the BBP provides forecasting 240 information to customize the programming content. Using the forecasting information by the BBP, a business application or a marketing media application, an exemplary application that uses BBP's forecasting 240 information, can play the programming content to the customer 760 based on the behavior analysis through the means for playing output 103. The marketing media application can also produce promotional message 620 on the means for playing output 103 based on the behavior analysis.

The measured behavioral composition of the viewers can be used to dynamically reprogram the display materials to match the current target audience. For this embodiment, a general purpose color video camera can be used as the means for capturing images 100 to deliver video frames to the computer via a USB or IEEE1394 connection. A wide-angle lens may be preferred to capture as many instances of faces as possible.

FIG. 26 shows an exemplary process of tracking and behavior analysis for a group of customers 761 in a preferred embodiment of the invention with a plurality of means for capturing images 100. In the exemplary embodiment, the BBP repeats the person tracking 714 for each customer 760 that appears in the field of view of a plurality of means for capturing images 100. When the BBP detects a group of customers 761 is approaching the means for playing output 103, the BBP analyzes the group behavior by the aggregated behavior analyses from the individual person tracking 714 information, such as the "person tracking 1" 715, "person tracking 2" 716, and "person tracking M" 717. The group behavior analysis 831 can be decided by a set of predefined rules, such as a majority rule, in which the major characteristics among the aggregated individual behavior analyses represent the entire group behavior. Then, using the forecasting information by the BBP, a marketing media application can play the programming content to the customer 760 based on the representative behavior characteristics of the group of people through the means for playing output 103. The marketing media application can also produce promotional message 620 on the means for playing output 103 based on the representative behavior characteristics of the group of people.

FIG. 27 shows exemplary flow of key processes in an exemplary embodiment of the invention. The BBP detects 770 each customer 760 from the input images, and then tracks 771 the customer 760 in the vicinity of a node 130. A computer vision based automatic behavioral statistics engine analyzes 830 the behavioral statistics of the customer 760. The behavioral information is extrapolated 238 for the characterization 239 and forecasting 240 of the customer behavioral statistics in each node 130. The characterization 239 and forecasting 240 results are reported to the decision maker of a site 150 or a media network 160 through queries 654. The decision maker can manually select 246 the programming contents based on the characterization 239 and forecasting 240 results and make a decision about the distributed programming contents. In an exemplary decision process 249 of the exemplary embodiment, the decision maker can look up 245 the programming contents in a programming content database 540 and process media distribution 247 of the selected media, such as "program A" 603 and "program N" 604, in the media network 160.

FIG. 28 shows exemplary flow of key processes in another exemplary embodiment of the invention, where the forecasting 240 is passed to the media server 124 rather than the decision maker of a site 150 or a media network 160. In this exemplary embodiment, the media server 124 processes the media distribution 247 of the forecast programming contents automatically, utilizing the direct feedback of customer behavioral forecasting 240 from the BBP.

FIG. 29 shows an exemplary clustering of sites based on point of sale (POS) data and store layout as a part of the exemplary extrapolation process. In the exemplary embodiment, sites with similar node types are clustered together. The node types are defined based on the POS data and the relative location of the node 130 in the store layout in each site 150. For example, the "site cluster 1" 171 can comprise "site 1" 151, "site 2" 152, and "site 3" 153, in the exemplary embodiment. Similarly, the "site cluster 2" 172 can comprise "site 4" 154 and "site 5" 155, and the "site cluster 3" 173 can comprise "site 6" 156 and "site 7" 157, in the exemplary embodiment.

The "site 1" 151, "site 2" 152, and "site 3" 153 in the "site cluster 1" 171 can comprise "node type 1" (NT1) 181, "node type 2" (NT2) 182, "node type 3" (NT3) 183, and "node type 4" (NT4) 184. Similarly, the "site 4" 154 and "site 5" 155 in the "site cluster 2" 172 can comprise "node type 5" (NT5) 185, "node type 6" (NT6) 186, and "node type 7" (NT7) 187. Furthermore, the "site 6" 156 and "site 7" 157 in the "site cluster 3" 173 can comprise "node type 8" (NT8) 188, "node type 9" (NT9) 189, and "node type 10" (NT10) 190.

However, not all the sites may have the same number of node types. In the exemplary embodiment, the "site 1" 151 comprises all the four different node types while the "site 2" 152 comprises only "node type 1" (NT1) 181, "node type 3" (NT3) 183, and "node type 4" (NT4) 184, and the "site 3" 153 comprises only "node type 2" (NT2) 182, "node type 3" (NT3) 183, and "node type 4" (NT4) 184.

FIG. 30 shows an exemplary table for the category of clustered sites 162 and an exemplary table for node type and information 163 for the exemplary extrapolation process in the BBP based on the clustering of the sites. The BBP can keep a table for the category of clustered sites 162, which comprises information for the site clusters and their associated node types. Once the categorization is processed, the BBP can produce a table for the list of node types and their associated information in the exemplary table for node type and information 163. The table comprises the attribute information for the node cluster category, site, and location of all the available nodes for each node type. In the exemplary embodiment shown in FIG. 30, the "node type 1" (NT1) 181 in the node type column comprises two sets of attributes, [CAT1, SITE1, LOC1] and [CAT1, SITE2, LOC1], which designate the "node type 1" (NT1) 181 in the "site 1" 151 and "site 2" 152. The "node type 1" (NT1) 181 cannot be found in any other sites in the media network 160 according to the exemplary embodiment. Similarly, the other node types in the node type column comprise their relevant sets of attributes, which designate the corresponding node types in the relevant sites.

Based on the exemplary table for node type and information 163, the BBP can select sample nodes per each node type and extrapolate the result to all the other nodes within the same node type category. For simplicity, the number of attribute sets per node type in the exemplary table for node type and information 163 shown in FIG. 30 is very minimal. However, in real-world application the number of attribute sets per node type is usually large. The percentage value of the sampling for the sample nodes per each node type can be predefined by the decision maker of the media network 160.

FIG. 31 and FIG. 32 show an exemplary forecasting 240 method in the BBP for the customers' behavioral statistics for the following week, month and year, based on historical data from the site 150 and also other similar sites in the media network 160. The BBP uses a time series analysis to generate trends in historical data and sites within the media network 160. From these trends, the BBP forecasts the data for each site 150. From the data for the sites, the BBP generates a forecast for the regions and enterprise levels in the exemplary embodiment.

FIG. 31 shows behavioral composition measurement 833, month of the year patterns 265, week of the month patterns 266, day of the week patterns 267, and hour of the day patterns 268 in the forecasting 240 process in an exemplary embodiment of the BBP.

FIG. 32 shows an exemplary forecasting 240 process in the exemplary embodiment of the BBP. After the BBP measures the customers' behavioral statistics for a period of time, it can produce the behavioral composition data for each behavioral category as shown in the graph of the behavioral composition measurement 833 in FIG. 31. For each behavioral category, the BBP can measure the growth rate pattern depending on the various levels of detail, such as the month of the year patterns 265, week of the month patterns 266, day of the week patterns 267, and hour of the day patterns 268 as shown in FIG. 31. The BBP can utilize these data in order to forecast the customer behavioral statistics for the targeted window of time. For example, the BBP can use the historic measurement data 271 and the measurement data until time t0 272, in order to forecast the customer behavioral statistics for a predefined targeted window of time, based on the growth rate in the month of the year patterns 265, as shown for the forecasting based on growth rate 273, in the exemplary embodiment in FIG. 32.

The BBP can update the forecasting 240 information to customize the programming contents adaptively and continuously based on the behavioral measurement 237 during the last predefined time frame in the history of the system operation. The predefined time frame can be set by the decision maker in a site 150 or in a media network 160. In another embodiment, the BBN can update the forecasting 240 to customize the programming contents only once at the beginning of the installation of a particular embodiment, based on the behavioral measurement 237 prior to the installation.

FIG. 33 shows exemplary factors that influence the accuracy of the forecast in an exemplary embodiment of the BBP. One way to isolate all the factors is through the use of exhaustive data, as shown in the required data column of the "first table for the factors influencing forecasts" 164 and the "second table for the factors influencing forecasts" 165. In the absence of sufficient data to capture those factors, expert input can be entered into the system to influence the forecasts, as shown in the tables of FIG. 33. By a mix of historical data and expert input, the system can start forecasting 240 right away. The weight of historical data vs. expert input keeps increasing as more historical data becomes available.

Furthermore, any trends that cannot be detected from the data, such as the economic growth in a region, or a new site, etc., can be taken into account by expert input. In the exemplary embodiment, the process that the BBP uses for forecasting 240 can be an expert in the loop forecast method. In this exemplary method, the BBP first analyzes the historical data to prepare it for forecasting 240 by detecting potential abnormalities. Then an expert classifies them into abnormalities or valid trends. Then, the BBP forecasts the data for the required period. The system keeps evaluating the performance of the forecasts and makes adjustments to the forecasts.

In the exemplary embodiment, the preparation of the data for forecasting 240 comprises both the analysis of the data for trends and abnormalities and the expert classification for the events into abnormality or trend. The forecasts in the BBP are based on the available trend and abnormality information after the data preparation, and the forecasts can be further adjusted by any new data that is added and accounted for, such as a weather change in a local area or past data.

FIG. 34 shows an exemplary data storage process in an exemplary embodiment of the BBP. In the exemplary embodiment, the system stores the data as a table 660, where each track has fields of values: exemplary fields are time stamps (start time 662 for customer appearance and end time 663 for customer disappearance), the track sequence and time (x,y,t), and behavior composition measurement 237. The data is used to collect statistics 635 of behavioral composition of the audience, and the statistics 635 can be represented as a pie chart 630, as a bar graph 637 or any data representation means in the exemplary embodiment. The data is accessible by the programming module, so that the system can reprogram the display material according to the behavioral statistics composition. The BBP can also store the behavior characterization 239 and forecasting 240 information, which are correlated to the plurality of nodes in a site 150 to the database.

FIG. 35 shows an exemplary marketing media application screen of customized programming content, where the exemplary embodiment of the marketing media application further provides targeted promotional messages, 621, 622, and 623, to the customer 760 in addition to the primary customized programming content 605 in order to encourage the customer 760 to engage in certain transactional activity based on the analysis of the behavioral pattern by the BBP.

Providing forecasting 240 information to help customize the programming contents in a media network 160 is the primary objective of the BBP. In addition, since the actual measurement 237 of the customer behavior and its analysis are available while the customer 760 is shopping, the BBP can also further provide targeted promotional messages even in real-time as the customer 760 approaches the means for playing output in an exemplary embodiment as shown in FIG. 35.

In the exemplary embodiment shown in FIG. 35, the marketing media application comprises the step of providing the promotional messages, 621, 622, and 623, to the customer 760 in addition to said programming display content based on the analysis of the behavioral pattern by the BBP. The promotional messages can be a promotional audio message 621, a promotional visual message 622, or a promotional textual message 623.

In the exemplary embodiment shown in FIG. 35, the marketing media application utilizing the BBP encourages the customer 760 to engage in certain transactional activity by playing a promotional audio message 621, such as "ITEM A IS ON SPECIAL SALE, AND IT IS IN AISLE NUMBER 5", a promotional textual message 623, such as "ITEM A IS ON SPECIAL SALE!", and a promotional visual 622 message to the customer 760, based on the analysis of the behavioral pattern.

FIG. 36 shows an exemplary map application screen 670, where the exemplary embodiment of the marketing media application indicates the specific area 674 of the promoted item in order to help the enticed engagement further. The map application screen 670 indicates the specific area 674 of the promoted item by displaying an arrow 675 to the specific area 674 where the promoted item is located. The map application screen 670 can also have the floor information 672 and legend 673.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for forecasting the behavioral characterization of a plurality of persons for each means for playing output of each site of a plurality of sites in a media network through automatically measuring and characterizing the behavioral information of a plurality of persons that appear in the vicinity of said each means for playing output, comprising the following steps of:
    a) capturing a plurality of input images of the plurality of persons in the vicinity of each measured means for playing output over a period of time by means for capturing images,
    b) processing the plurality of input images in order to measure the behavioral information of the plurality of persons using a computer vision based behavioral statistics engine in a computer,
    c) transferring the behavioral information measurement data from each computer to a central server,
    d) extrapolating the measurement of the behavioral information in order to characterize the behavioral information for said each means for playing output of said each site, and
    e) forecasting the behavioral characterization of a plurality of persons for said each means for playing output of said each site,
    wherein the extrapolation, the characterization, and the forecasting of behavioral characterization for said each means for playing output are processed in the central server,
    whereby the behavioral characterization is used to help customize programming contents in the media network, and
    whereby an exemplary media network comprises a large number of stores as the plurality of sites, where each store has a large number of means for playing output.

2. The method according to claim 1, wherein the method further comprises a step of measuring the behavioral information through path analysis of said plurality of persons in each site,
    wherein the path analysis comprises attributes for temporal pattern, spatial preference pattern, frequency pattern, relational pattern, and special event pattern.

3. The method according to claim 1, wherein the method further comprises a step of organizing the behavioral information as statistical data per time slot.

4. The method according to claim 1, wherein the method further comprises a step of utilizing expert input to influence the forecasting,
    wherein the expert input is mixed with historical data for the forecasting.

5. The method according to claim 1, wherein the method further comprises a step of updating the forecasting to customize the programming contents adaptively and continuously based on the behavioral measurement and forecasting during the last predefined time frame in the history of the system operation.

6. The method according to claim 1, wherein the method further comprises a step of extrapolating the plurality of persons' behavioral measurements from sampled nodes to all the other nodes within the same node type category based on the node types, and the clustering of sites based on point of sale data and store layout.

7. The method according to claim 1, wherein the method further comprises a step of forecasting the plurality of persons' behavioral statistics based on the growth rate patterns in various levels of detail and the historical measurement of the plurality of persons' behavioral statistics.

8. The method according to claim 1, wherein the method further comprises a step of measuring, characterizing, and forecasting the behavior of a group of persons for each means for playing output of said each site based on predefined group behavior analysis rules,
    wherein the measurement, characterization, and forecasting of the behavior of a group of persons represent different semantics than a simple collection of behavior analyses for the plurality of persons in the group of persons at the means for playing output.

9. The method according to claim 1, wherein the method further comprises a step of correlating a plurality of categories in a site to various behavior characterization and shopping interaction levels of said plurality of persons,
    wherein the category is a logically predefined entity that comprises a group of products, a group of product types, space, an area in a store, a group of areas in a store, a display of a group of products, or a department with similar items.

10. The method according to claim 9, wherein the method further comprises a step of forming a string of behavior measurement for said plurality of persons during a window of time,
    wherein each element in the string of behavior measurement for a person of said plurality of persons comprises a 3-tuple, consisting of category number, interaction level, and information with regard to the means for playing output.

11. The method according to claim 9, wherein the method further comprises a step of producing a plurality of maps as display of qualitative visualization for overall shopping behavior and characterization and forecasting of the behavior of said plurality of persons in the site,
    wherein the maps use color-coded symbolic expressions to differentiate the behavior characterization and forecasting among a plurality of behavior characterizations and forecasting at the site.

12. The method according to claim 9, wherein the method further comprises a step of calculating quantitative measurement per category,
    wherein the quantitative measurement comprises a ratio between shopping interaction levels based on actual measurement for the shopping interaction levels of said plurality of persons.

13. The method according to claim 9, wherein the method further comprises a step of measuring dominant path at a certain location in the site.

14. The method according to claim 9, wherein the method further comprises a step of measuring category correlation among the plurality of categories in shopping paths of the plurality of persons for calculating optimal distance between categories.

15. The method according to claim 9, wherein the method further comprises a step of measuring category sequence among the plurality of categories in shopping paths of the plurality of persons, which includes the order of engagement.

16. The method according to claim 1, wherein the method further comprises a step of defining and utilizing spatio-temporal primitives for modeling the behavior of a plurality of persons in said each site.

17. The method according to claim 1, wherein the method further comprises a step of defining and utilizing shopping interaction levels for analyzing the behavior category of a plurality of persons in said each site.

18. The method according to claim 1, wherein the method further comprises a step of storing the track sequence and associated time, behavior composition measurement, behavior characterization, and behavior forecasting information, which are correlated to the plurality of nodes in a site, to a database.

19. The method according to claim 1, wherein the method further comprises a step of providing targeted promotional messages to said plurality of persons within the customized programming content in order to encourage said plurality of persons to engage in certain transactional activity based on the analysis and forecasting of the behavioral pattern.

20. The method according to claim 19, wherein the method further comprises a step of displaying a map application screen, wherein a marketing media application indicates the specific area of the promoted item by displaying an arrow to the specific area where the promoted item is located in order to help the enticed engagement further.

21. An apparatus for forecasting the behavioral characterization of a plurality of persons for each means for playing output of each site of a plurality of sites in a media network through automatically measuring and characterizing the behavioral information of a plurality of persons that appear in the vicinity of said each means for playing output, comprising:
 a) means for capturing images that captures a plurality of input images of the plurality of persons in the vicinity of each measured means for playing output over a period of time,
 b) a computer for processing the plurality of input images in order to measure the behavioral information of the plurality of persons using a computer vision based behavioral statistics engine,
 wherein the behavioral information measurement data from each computer is transferred to a central server,
 c) the central server for extrapolating the measurement of the behavioral information in order to characterize the behavioral information for said each means for playing output of said each site, and
 d) the central server for forecasting the behavioral characterization of a plurality of persons for said each means for playing output of said each site,
 whereby the behavioral characterization is used to help customize programming contents in the media network, and
 whereby an exemplary media network comprises a large number of stores as the plurality of sites, where each store has a large number of means for playing output.

22. The apparatus according to claim 21, wherein the apparatus further comprises means for measuring the behavioral information through path analysis of said plurality of persons in each site,
 wherein the path analysis comprises attributes for temporal pattern, spatial preference pattern, frequency pattern, relational pattern, and special event pattern.

23. The apparatus according to claim 21, wherein the apparatus further comprises means for organizing the behavioral information as statistical data per time slot.

24. The apparatus according to claim 21, wherein the apparatus further comprises means for utilizing expert input to influence the forecasting,
 wherein the expert input is mixed with historical data for the forecasting.

25. The apparatus according to claim 21, wherein the apparatus further comprises means for updating the forecasting to customize the programming contents adaptively and continuously based on the behavioral measurement and forecasting during the last predefined time frame in the history of the system operation.

26. The apparatus according to claim 21, wherein the apparatus further comprises means for extrapolating the plurality of persons' behavioral measurements from sampled nodes to all the other nodes within the same node type category based on the node types, and the clustering of sites based on point of sale data and store layout.

27. The apparatus according to claim 21, wherein the apparatus further comprises means for forecasting the plurality of persons' behavioral statistics based on the growth rate patterns in various levels of detail and the historical measurement of the plurality of persons' behavioral statistics.

28. The apparatus according to claim 21, wherein the apparatus further comprises means for measuring, characterizing, and forecasting the behavior of a group of persons for each means for playing output of said each site based on predefined group behavior analysis rules,
 wherein the measurement, characterization, and forecasting of the behavior of a group of persons represent different semantics than a simple collection of behavior analyses for the plurality of persons in the group of persons at the means for playing output.

29. The apparatus according to claim 21, wherein the apparatus further comprises means for correlating a plurality of categories in a site to various behavior characterization and shopping interaction levels of said plurality of persons,
 wherein the category is a logically predefined entity that comprises a group of products, a group of product types, space, an area in a store, a group of areas in a store, a display of a group of products, or a department with similar items.

30. The apparatus according to claim 29, wherein the apparatus further comprises means for forming a string of behavior measurement for said plurality of persons during a window of time,
 wherein each element in the string of behavior measurement for a person of said plurality of persons comprises a 3-tuple, consisting of category number, interaction level, and information with regard to the means for playing output.

31. The apparatus according to claim 29, wherein the apparatus further comprises means for producing a plurality of maps as display of qualitative visualization for overall shopping behavior and characterization and forecasting of the behavior of said plurality of persons in the site,
- wherein the maps use color-coded symbolic expressions to differentiate the behavior characterization and forecasting among a plurality of behavior characterizations and forecasting at the site.

32. The apparatus according to claim 29, wherein the apparatus further comprises means for calculating quantitative measurement per category,
- wherein the quantitative measurement comprises a ratio between shopping interaction levels based on actual measurement for the shopping interaction levels of said plurality of persons.

33. The apparatus according to claim 29, wherein the apparatus further comprises means for measuring dominant path at a certain location in the site.

34. The apparatus according to claim 29, wherein the apparatus further comprises means for measuring category correlation among the plurality of categories in shopping paths of the plurality of persons for calculating optimal distance between categories.

35. The apparatus according to claim 29, wherein the apparatus further comprises means for measuring category sequence among the plurality of categories in shopping paths of the plurality of persons, which includes the order of engagement.

36. The apparatus according to claim 21, wherein the apparatus further comprises means for defining and utilizing spatio-temporal primitives for modeling the behavior of a plurality of persons in said each site.

37. The apparatus according to claim 21, wherein the apparatus further comprises means for defining and utilizing shopping interaction levels for analyzing the behavior category of a plurality of persons in said each site.

38. The apparatus according to claim 21, wherein the apparatus further comprises means for storing the track sequence and associated time, behavior composition measurement, behavior characterization, and behavior forecasting information, which are correlated to the plurality of nodes in a site, to a database.

39. The apparatus according to claim 21, wherein the apparatus further comprises means for providing targeted promotional messages to said plurality of persons within the customized programming content in order to encourage said plurality of persons to engage in certain transactional activity based on the analysis and forecasting of the behavioral pattern.

40. The apparatus according to claim 39, wherein the apparatus further comprises means for displaying a map application screen, wherein a marketing media application indicates the specific area of the promoted item by displaying an arrow to the specific area where the promoted item is located in order to help the enticed engagement further.

* * * * *